US011035301B1

(12) United States Patent
Oh et al.

(10) Patent No.: US 11,035,301 B1
(45) Date of Patent: Jun. 15, 2021

(54) METHOD FOR PREVENTING ENGINE AIR FLOW CALCULATION ERROR AND ENGINE SYSTEM THEREOF

(71) Applicants: Hyundai Motor Company, Seoul (KR); Kia Motors Corporation, Seoul (KR)

(72) Inventors: Young-Kyu Oh, Gwacheon-si (KR); Keum-Jin Park, Anyang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/985,425

(22) Filed: Aug. 5, 2020

(30) Foreign Application Priority Data

May 6, 2020 (KR) .......................... 10-2020-0053681

(51) Int. Cl.
 *F02M 25/08* (2006.01)
 *F02D 9/02* (2006.01)
 *F02D 21/08* (2006.01)

(52) U.S. Cl.
 CPC ............... *F02D 9/02* (2013.01); *F02D 21/08* (2013.01); *F02M 25/0836* (2013.01); *F02D 2009/0276* (2013.01); *F02D 2200/0406* (2013.01)

(58) Field of Classification Search
 CPC .................... F02M 2200/0406; F02M 2026/01
 See application file for complete search history.

(56) References Cited

U.S. PATENT DOCUMENTS

| 8,489,307 | B2 * | 7/2013 | Burkhardt | ........... F02B 27/0294 |
| | | | | 701/102 |
| 9,228,524 | B2 * | 1/2016 | Song | .................... F02D 41/1458 |
| 9,810,171 | B2 * | 11/2017 | Racelis | .................. F02D 41/222 |
| 10,066,564 | B2 * | 9/2018 | Song | ...................... F02D 41/144 |
| 2005/0022795 | A1 * | 2/2005 | Beyer | ..................... F01M 11/10 |
| | | | | 123/516 |
| 2010/0185379 | A1 * | 7/2010 | Burkhardt | ............... F02D 41/18 |
| | | | | 701/103 |
| 2013/0319377 | A1 * | 12/2013 | Stevens | ................... F02D 41/40 |
| | | | | 123/480 |
| 2014/0283800 | A1 * | 9/2014 | Hellstrom | ........... F02D 41/0062 |
| | | | | 123/568.14 |

FOREIGN PATENT DOCUMENTS

KR 10-2003-0039007 A 5/2003

* cited by examiner

*Primary Examiner* — Thomas N Moulis
(74) *Attorney, Agent, or Firm* — Morgan, Lewis & Bockius LLP

(57) ABSTRACT

A method for preventing an engine air flow calculation error applied to an engine system may classify an engine operation area of an engine into a sensor measurement deviation generation area, medium/high load areas, and a low load area by an ECU, and classify an air flow calculation applied to a cylinder charging amount of the engine as one of an air flow calculation control applying a compensation measurement air flow to the sensor measurement deviation generation area, an air flow calculation control applying a measurement pressure to the medium/high load areas, and an air flow calculation control applying a measurement air flow to the low load area, excluding influence of an HFM sensor error causing a change in a fresh air charge and inaccuracy of an exhaust gas recirculation (EGR) air flow modeling/active purge air flow modeling in the entire operation area of the engine.

20 Claims, 13 Drawing Sheets

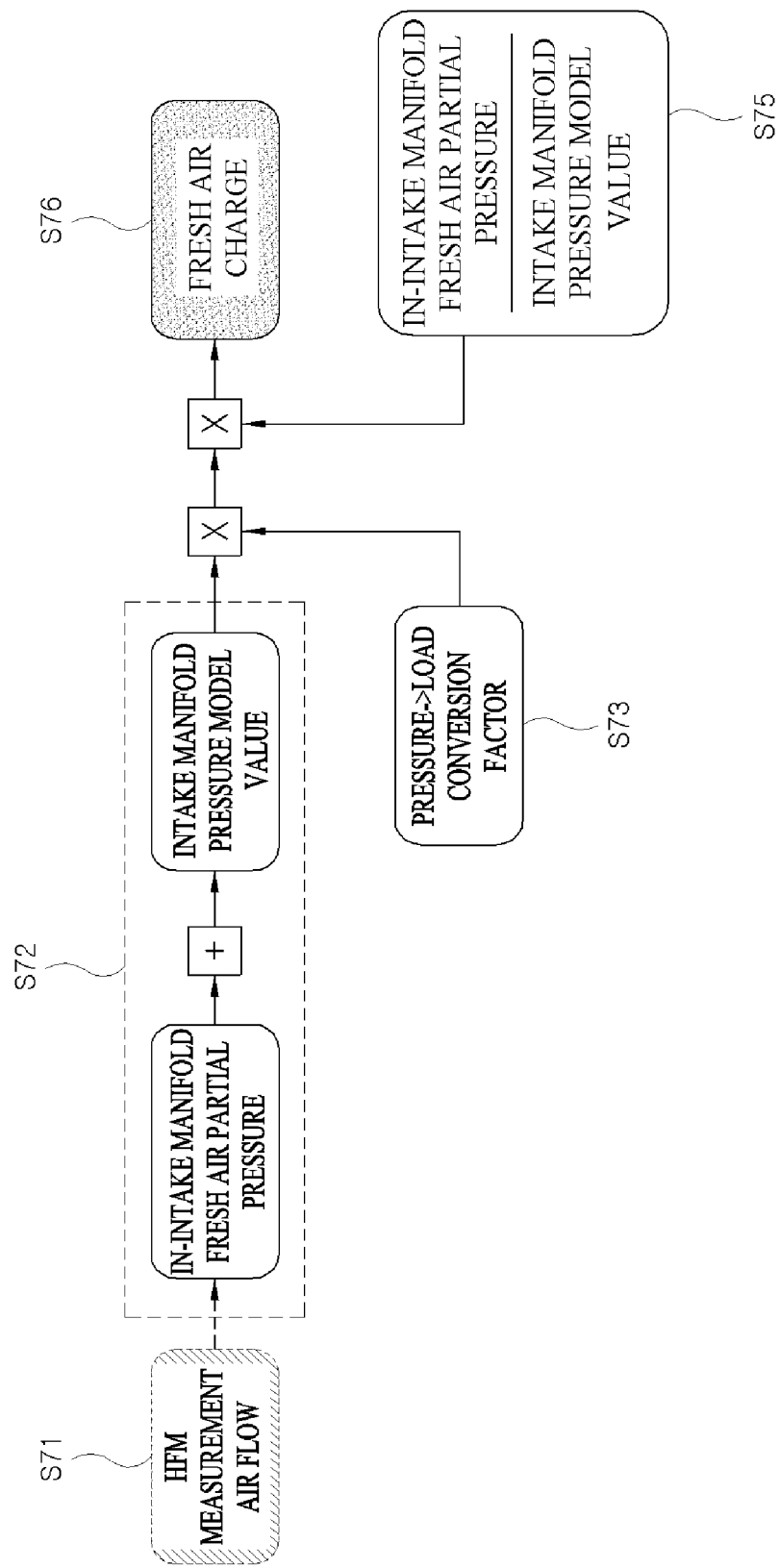

METHOD FOR PREVENTING ENGINE AIR FLOW CALCULATION ERROR AND ENGINE SYSTEM THEREOF

CROSS-REFERENCE TO RELATED APPLICATION

The present application claims priority to Korean Patent Application No. 10-2020-0053681, filed on May 6, 2020, the entire contents of which is incorporated herein for all purposes by this reference.

BACKGROUND OF THE PRESENT INVENTION

Field of the Invention

The present invention relates to a method for calculating an engine air flow, and to an engine system, which may apply different detection values of an air flow sensor according to an engine operation area, blocking the adverse effect that a physical measurement deviation of a hot-film air mass flow (HFM) sensor among air flow sensors causes miscalculation of the engine air flow.

Description of Related Art

Generally, an engine system for a vehicle supplies a purge air flow of an active purge system (AFS) together with an exhaust gas recirculation (EGR) air flow of an exhaust gas recirculation (EGR) system and thus is classified as a combined function engine system to apply an HFM sensor and a manifold air pressure or manifold absolute pressure (MAP) sensor as an air flow sensor, and to use a measurement air flow and a measurement pressure for determining an engine air flow required by an engine during the engine operation with the sensor measurement value.

The engine air flow (Kg/h) necessary for engine combustion is a cylinder intake air flow (or a cylinder charging amount) of a cylinder (that is, a combustion chamber) and is equal to a throttle passing air flow which passes a throttle mounted on an intake manifold of an intake system.

As an example, the HFM sensor is mounted at the front end portion of the throttle (that is, the front location of the throttle) mounted in the intake system whereas the MAP sensor is mounted at the rear end portion of the throttle (that is, the rear location of the throttle).

Accordingly, the HFM sensor measures a fresh air (that is, an air flow of the outside air of the engine) introduced into the intake manifold from the front end portion of the throttle as an HFM air flow, and the MAP sensor measures a throttle passing air flow including the air flows of the fresh air and an EGR gas as an MAP air pressure (or an MAP air flow) by passing the throttle at the rear end portion of the throttle. However, in the combined function engine system, the MAP air pressure (or the MAP air flow) may be the sum of the HFM air flow and the EGR air flow or the sum of the HFM air flow, the EGR air flow, and the purge air flow.

Accordingly, an electronic control unit (ECU) confirms the accuracy of the measurement value of the HFM sensor and the measurement value of the MAP sensor by matching the HFM air flow with an HFM modeling and matching the MAP air flow with an MAP modeling, and determines an engine air flow through the compensation with the MAP air flow by obtaining the throttle passing air flow from the sum of the HFM air flow and the EGR air flow.

The contents described in Description of Related Art are to help the understanding of the background of the present invention, and may include what is not previously known to those skilled in the art to which various exemplary embodiments of the present invention pertains.

However, the HFM sensor has a limitation in that a deviation of the measurement air flow of the HFM sensor is large for use as a main sensor for measuring a fresh air.

Such a limitation of the HFM sensor is further exacerbated if an engine system is operated with a combined technology of supplying a purge air flow while supplying the EGR air flow at a low differential pressure using a low pressure (LP)-EGR system among the EGR systems, necessarily increasing the inaccuracy of the determination of the engine air flow.

As an example, when the purge air flow is supplied by operation of an AFS in a state where the EGR air flow with the low differential pressure is supplied by the operation of the LP-EGR system, the inaccurate HFM air flow of the HFM sensor affects an EGR air flow model and an active purge air flow model, such that the model calculation values of the EGR air flow model and the active purge air flow model are larger or smaller than actual values.

As a result, the inaccurate air flow model makes it impossible to respond to the deviation of the intake system with one pulsation compensation value data, furthermore which necessarily causes a change in a fresh air charge according to the calculation of the engine air flow during the operations of the EGR system and the AFS.

Furthermore, the active purge operation of the AFS needs the drive of a pump, and the pump not only generates a pump speed chattering even if the air flow and a duty value of a purge control solenoid valve (PCSV) in some sections are constant, but also necessarily needs more actual accuracy for a modeling of the active purge air flow (or concentration) in consideration of the aspect of causing a change in a target speed value at the time of selecting a pump speed because a hysteresis for the air flow fluctuation is set small.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a method for preventing an engine air flow calculation error and an engine system thereof, which match an HFM air flow control, an MAP air flow control, and an air flow compensation control to a low load area, medium/high load areas, and a sensor measurement deviation generation area into which an engine operation area is classified, respectively, eliminating the influence of the inaccuracy on the air flow calculation due to the measurement deviation caused by the air flow sensor, and match the sensor measurement deviation generation area under the air flow compensation control, preventing the inaccurate calculation of the EGR air flow model and the active purge air flow model even in the operation condition in which the purge air flow is supplied together with the low differential pressure EGR air flow.

A method for preventing an engine air flow calculation error according to various exemplary embodiments of the present invention for achieving the object includes: classifying an engine operation area of an engine into a sensor measurement deviation generation area, medium/high load areas, and a low load area by an ECU; and applying a medium/high load air flow control which performs an air flow calculation with a measurement pressure of an MAP sensor in the medium/high load areas, applying a low load air flow control which performs an air flow calculation with a measurement air flow of an HFM sensor in the low load area, and performing an air flow control accompanied by a measurement air flow compensation in which the air flow calculation is performed by compensating the measurement air flow of the HFM sensor in the sensor measurement deviation generation area.

Furthermore, the present invention for achieving the object, the method for preventing an engine air flow calculation error by an ECU includes classifying an engine operation area into a sensor measurement deviation generation area in addition to medium/high load areas and a low load area; applying controlling a medium/high load air flow which performs an air flow calculation with a measurement pressure of an MAP sensor in the medium/high load areas; applying controlling a low load air flow which performs the air flow calculation with a measurement air flow of an HFM sensor in the low load area; and applying controlling an air flow accompanied by a measurement air flow compensation in which the air flow calculated is performed by compensating the measurement air flow of the HFM sensor in the sensor measurement deviation generation area.

As various exemplary embodiments of the present invention, the sensor measurement deviation generation area is determined by torque abnormality or air flow abnormality of the engine, the torque abnormality is confirmed by a required torque and a model torque, and the air flow abnormality is confirmed by a required air flow and a model air flow.

As various exemplary embodiments of the present invention, the medium/high load areas and the low load area are classified by an air flow flowing through an intake system.

As various exemplary embodiments of the present invention, the air flow control accompanied by the measurement air flow compensation includes: detecting a measurement air flow by the HFM sensor; determining a boost pressure formed in an intake manifold of an intake system in the engine as a target boost pressure; determining a compensated target boost pressure as a fresh air charge by compensating the target boost pressure with a pressure/load conversion factor and an intake manifold pressure ratio; and performing the air flow calculation depending on the fresh air charge.

As various exemplary embodiments of the present invention, the compensation of the target boost pressure includes: determining an in-intake manifold compensation fresh air partial pressure value based on an in-intake manifold fresh air partial pressure value; determining an intake manifold pressure model compensation value based on an intake manifold pressure model value; and applying the in-intake manifold compensation fresh air partial pressure value and the intake manifold pressure model compensation value.

As various exemplary embodiments of the present invention, the determining of the in-intake manifold compensation fresh air partial pressure value includes: confirming an in-intake manifold fresh air partial pressure value; confirming an in-intake manifold EGR air flow partial pressure value by being matched with an EGR air flow model map; confirming an in-intake manifold pre/post-purge pump partial pressure value by being matched with an active purge air flow model map; and applying the in-intake manifold EGR air flow partial pressure value and the in-intake manifold pre/post-purge pump partial pressure value to the in-intake manifold fresh air partial pressure.

As various exemplary embodiments of the present invention, the determining of the intake manifold pressure model compensation value includes: confirming the intake manifold pressure model value by being matched with an intake manifold pressure model map; confirming an in-intake manifold EGR air flow partial pressure value by being matched with an EGR air flow model map; confirming an in-intake manifold active purge air flow partial pressure value by being matched with an active purge air flow model map; and applying the in-intake manifold EGR air flow partial pressure value and the in-intake manifold active purge air flow partial pressure value to the intake manifold pressure model value.

As various exemplary embodiments of the present invention, the pressure/load conversion factor is confirmed by matching a boost pressure of an intake manifold pressure model map with an engine load of an air flow model map. An in-intake manifold fresh air partial pressure value and an intake manifold model value are applied to the intake manifold pressure ratio.

As various exemplary embodiments of the present invention, the medium/high load air flow control includes: detecting a measurement pressure by the MAP sensor; determining a boost pressure formed in an intake manifold of an intake system in the engine as a target boost pressure; determining a compensated target boost pressure as a total amount of fresh air charges by compensating the target boost pressure with a pressure/load conversion factor; compensating the total amount of fresh air charges with a fresh air charge; and performing the air flow calculation depending on the fresh air charge.

As various exemplary embodiments of the present invention, the determining of the target boost pressure includes: confirming an in-intake manifold EGR air flow partial pressure value by being matched with an EGR air flow model map; confirming an in-intake manifold active purge air flow partial pressure value by being matched with an active purge air flow model map; and applying the in-intake manifold EGR air flow partial pressure value and the in-intake manifold active purge air flow partial pressure value.

As various exemplary embodiments of the present invention, the pressure/load conversion factor is confirmed by matching a boost pressure of an intake manifold pressure model map with an engine load of an air flow model map.

As various exemplary embodiments of the present invention, the compensating of the fresh air charge includes: confirming an in-intake manifold pre/post-purge pump partial pressure value by being matched with an active purge air flow model map; confirming an in-intake manifold EGR air flow partial pressure value by being matched with an EGR air flow model map; detecting an HFM air flow measurement value; and converting an intake manifold pressure ratio into an intake manifold compensation pressure ratio and applying the intake manifold compensation pressure ratio to the total amount of the fresh air charges.

As various exemplary embodiments of the present invention, the intake manifold pressure ratio applies an in-intake manifold fresh air partial pressure value and an intake manifold pressure model value, and a compensation constant is applied to intake manifold compensation pressure ratio.

As various exemplary embodiments of the present invention, the low load air flow control includes: detecting a measurement air flow by the HFM sensor; determining a boost pressure formed in an intake manifold of an intake system in the engine as a target boost pressure using an in-intake manifold fresh air partial pressure value and an intake manifold pressure model value of an intake manifold pressure model map; determining a compensated target boost pressure as a fresh air charge by compensating the target boost pressure with a pressure/load conversion factor and an intake manifold pressure ratio; and performing the air flow calculation depending on the fresh air charge.

As various exemplary embodiments of the present invention, the pressure/load conversion factor is confirmed by matching the boost pressure of the intake manifold pressure model map with an engine load of an air flow model map, and the intake manifold pressure ratio applies the in-intake manifold fresh air partial pressure value and the intake manifold pressure model value.

As various exemplary embodiments of the present invention, each of the air flow compensation control, the MAP air flow control, and the HFM air flow control applies an air flow calculation value as a cylinder charging amount of the engine.

Furthermore, an engine system according to various exemplary embodiments of the present invention for achieving the object includes: an ECU which classifies an engine operation area of an engine into a sensor measurement deviation generation area, medium/high load areas, and a low load area, and classifies, as an air flow calculation control applied to a cylinder charging amount of the engine, one of an air flow compensation control which applies a compensation measurement air flow to the sensor measurement deviation generation area, an MAP air flow control which applies a measurement pressure to the medium/high load areas, and an HFM air flow control which applies a measurement air flow to the low load area; an HFM sensor which detects an air flow applied to the compensation measurement air flow and the measurement air flow in an intake manifold of an intake system; an MAP sensor which detects an air pressure applied to the measurement pressure in the intake manifold of the intake system; an AFS which traps an evaporation gas of fuel, and sends the trapped evaporation gas to the intake system to purge the evaporation gas; and an EGR system which uses, as an EGR gas, and sends some exhaust gases of the exhaust gases flowing through an exhaust system of the engine by the intake system.

As various exemplary embodiments of the present invention, the HFM sensor is located at a front end portion of a throttle mounted in the intake system whereas the MAP sensor is located at a rear end portion of the throttle.

As various exemplary embodiments of the present invention, the AFS is connected to a PCSV which is mounted at a rear end portion of the MAP sensor in the intake system.

As various exemplary embodiments of the present invention, the EGR system is an LP-EGR system which extracts and uses the EGR gas from the rear of a turbo charger mounted in the exhaust system.

As various exemplary embodiments of the present invention, during the air flow calculation control, the ECU matches the EGR gas air flow with an EGR air flow model map, and matches a purge air flow with an active purge air flow model map.

As various exemplary embodiments of the present invention, in the ECU, each of the air flow compensation control, the MAP air flow control and the HFM air flow control outputs an air flow calculation value to a hybrid control unit (HCU) which controls the engine.

The method for preventing the engine air flow calculation error applied to the combined engine system according to various exemplary embodiments of the present invention implements the following operations and effects by classifying the engine operation area into at least three sections to perform the air flow calculation.

First, by eliminating the measurement deviation of the HFM sensor in the operation area, in which the deviation of the calculation values between the required torque (or the required air flow) and the model torque (or the model air flow) occurs, under the air flow compensation control, it is possible to maintain the roles of the HFM sensor and the MAP sensor in the entire operation area of the engine. Second, the HFM sensor having the deviation of the measurement air flow greater than that of the MAP sensor removes the influence of the inaccuracy on the calculation of the engine air flow. Third, by eliminating the increase or decrease in the air flow caused by the difference between the calculation values through the EGR/active purge air flow models by excluding the influence of the measurement deviation of the HFM sensor, it is possible to maintain the charge of the fresh air without a change. Fourth, even if the combined engine system which implements the CVVD/EGR/active purge with the combined technology utilizes the HFM/MAP sensors together, the combined engine system may be operated without degrading the performance by the engine air flow calculation error. Fifth, the combined engine system may accurately perform the engine air flow calculation, thereby improving the performance of the Lambda Lean Peak (1.1 to 1.3)/Rich (0.7 to 0.9) control logic.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 13 is a block diagram illustrating the HFM air flow control according to various exemplary embodiments of the present invention.

Figure 1:
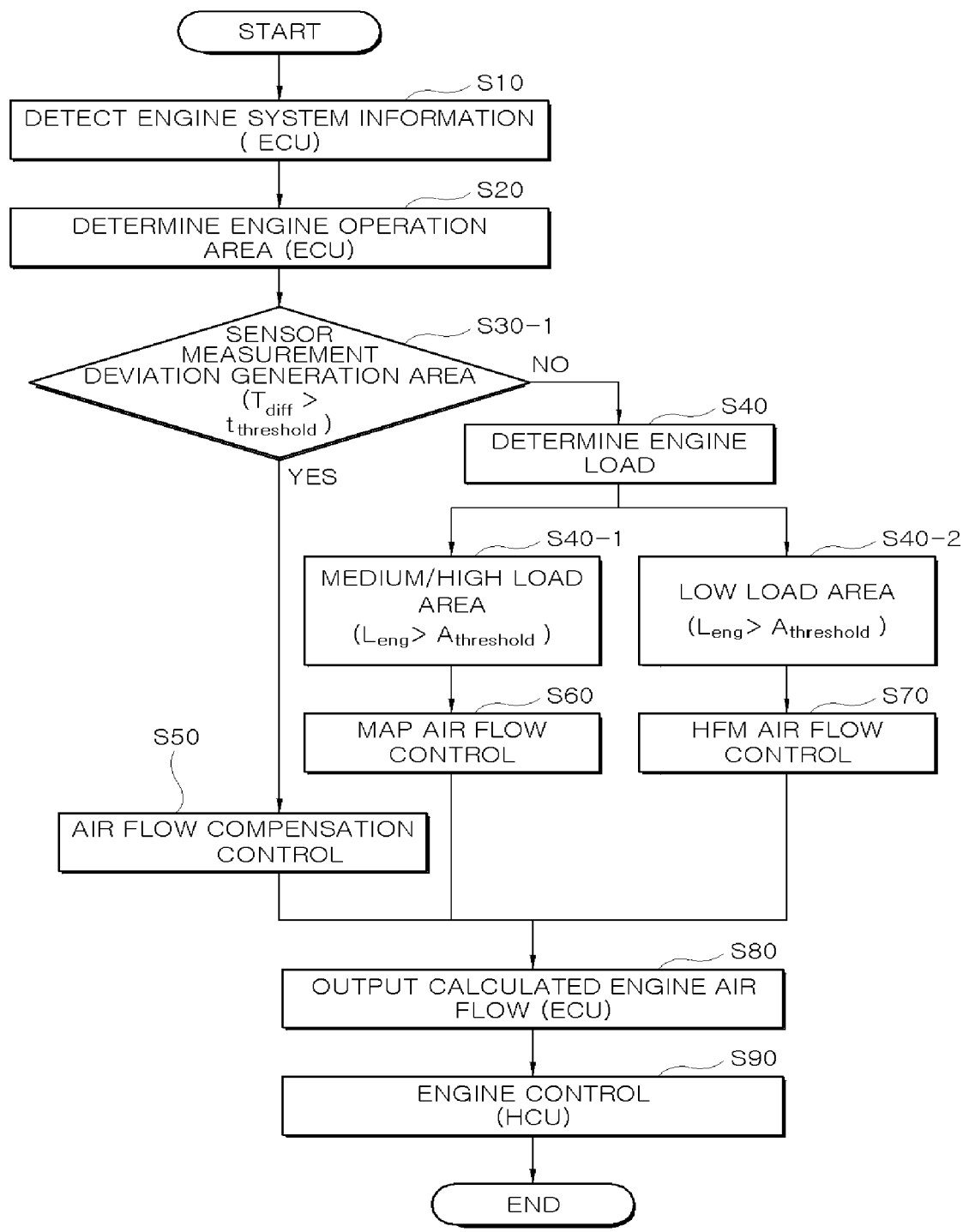
FIG. 1 is a flowchart illustrating a method for preventing an engine air flow calculation error according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the accompanying exemplary drawings, and these exemplary embodiments are examples and may be implemented in various different forms by those skilled in the art to which various exemplary embodiments of the present invention pertains, and thus are not limited to the exemplary embodiments described herein.

Referring to FIG. 1, a method for preventing an engine air flow calculation error calculates an engine air flow value under an engine air flow calculation control (S30-1 to S70) in which an HFM sensor and an MAP sensor are differently used for each of three engine operation areas into which an engine operation area (S20) according to engine system detection information (S10) is classified so that an accurate engine air flow may be supplied according to a throttle passing air flow of an intake manifold (or a cylinder intake air flow necessary for a cylinder of the engine) during an engine control (S80 and S90).

As an example, the engine air flow calculation control (S30-1 to S70) classifies three engine operation areas into a sensor measurement deviation generation area (S30-1), and medium/high load areas (S40-1) and a low load area (S40-2) based on the engine load, and performs an air flow control accompanied by a measurement air flow compensation under an air flow compensation control (S50) which compensates the measurement value deviation of the HFM sensor in the sensor measurement deviation generation area (S30-1), whereas performing the air flow control under an HFM air flow control (S70), in which the measurement value of the HFM sensor is used, in the low load area (S40-2) while performing the air flow control under an MAF air flow control (S60), in which the measurement value of the MAF sensor is used, in the medium/high load areas (S40-1).

Accordingly, the method for preventing the engine air flow calculation error may allow the HFM sensor used with the MAF sensor for calculating the engine air flow to be used as main sensors for measuring a fresh air in the engine system to which an EGR system, an active purge system, and a continuous variable valve duration (CVVD) system are applied, and prevent the excessive miscalculation of the air flow caused by applying the combined technology during the calculation of the HFM based engine air flow if the engine system is operated with the combined technology which supplies a purge air flow while supplying the low differential pressure EGR air flow from an LP-EGR system, thereby implementing a logic application security due to an operation area Lambda Lean Peak (1.1 to 1.3) and Rich (0.7 to 0.9) control.

Figure 2:
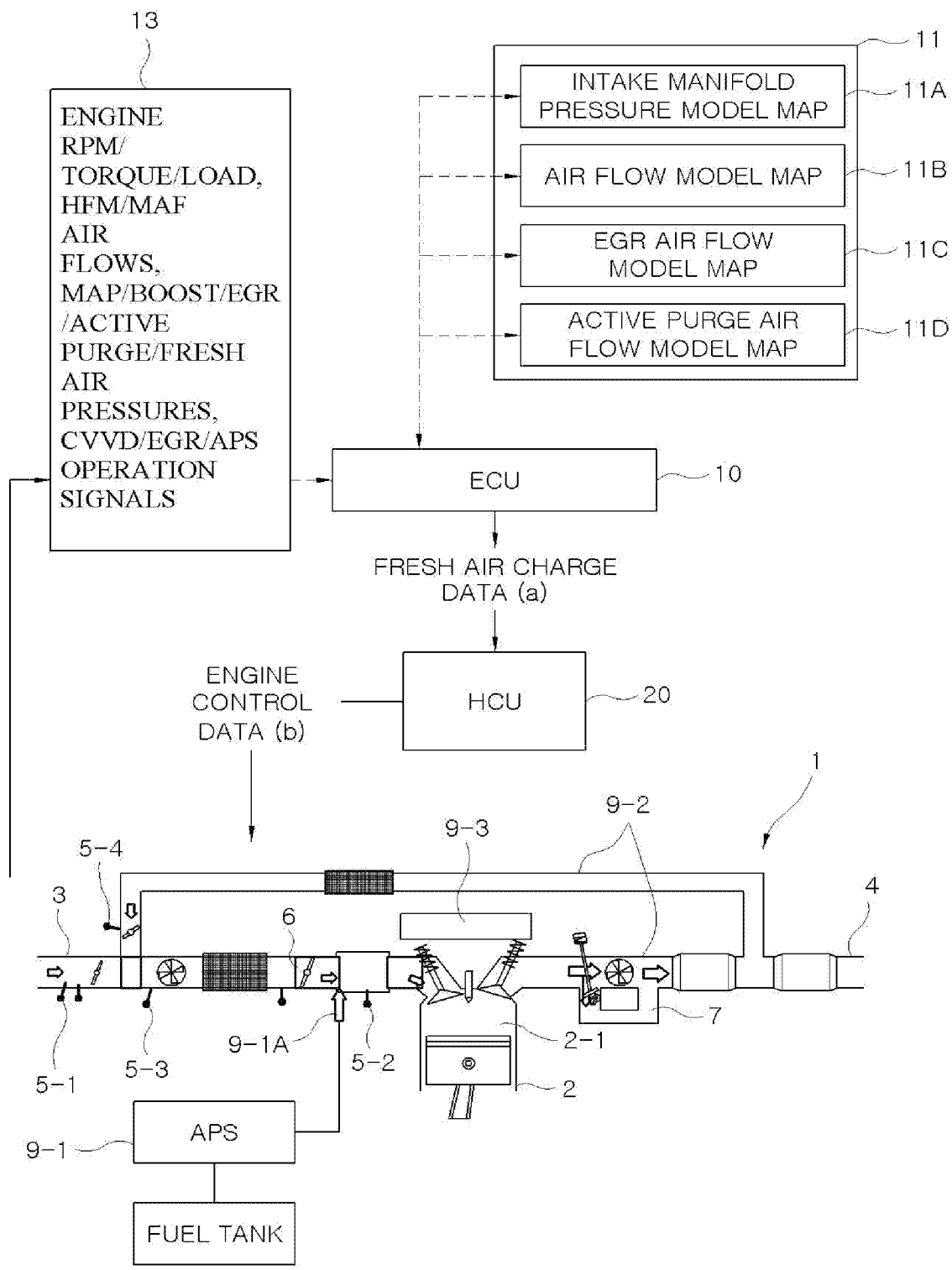
FIG. 2 is a diagram illustrating an example of an engine system which implements the method for preventing the engine air flow calculation error according to various exemplary embodiments of the present invention.

Meanwhile, referring to FIG. 2, the engine system 1 includes an engine 2, an intake system 3, an exhaust system of the engine 4, a sensor 5, a throttle 6, a turbo charger 7, a combined function apparatus, an electronic control unit (ECU) 10, and a hybrid control unit (HCU) 20. Furthermore, although sensors which detect engine RPM/torque/load, HPM/MAF air flows, MAP/boost/EGR/active purge/fresh air pressures, CVVD/EGR/AFS operation signals, and the like are not illustrated in the engine system 1, it is obvious that they are mounted as basic components of the engine system 1.

The engine 2 is an internal combustion engine using a cylinder 2-1 as a combustion chamber; the intake system 3 is an intake manifold and supplies an outside air output from a filter to the cylinder 2-1 as a fresh air; the exhaust system 4 is an exhaust manifold and discharges an exhaust gas output after combusted in the cylinder 2-1; the throttle 6 adjusts an air flow by controlling an intake manifold passage area of the intake system 3 with a throttle position scope (TPS); and the turbo charger 7 includes a turbine which is rotated by the exhaust gas flowing through the exhaust manifold passage of the exhaust system 4 and a compressor which compresses the outside air flowing through the intake manifold passage of the intake system 3. Accordingly, the engine 2, the intake system 3, the exhaust system 4, the throttle 6, and the turbo charger 7 are basic components of the engine system.

The sensor 5 includes a hot-film air mass flow (HFM) sensor 5-1, a manifold air pressure (MAP) sensor 5-2, a mass air flow (MAF) sensor 5-3, and an intake pressure sensor 5-4.

As an example, the HFM sensor 5-1 is mounted on the intake manifold to measure the outside air output from the filter at the front end portion of the throttle 6 to detect an air flow, and the MAP sensor 5-2 is mounted on the intake manifold to measure a pressure of a throttle passing air flow output from the throttle 6 at the rear end portion of the throttle 6 (or the front end portion of the cylinder) to detect an air pressure. As described above, the reason why the HFM sensor 5-1 and the MAP sensor 5-2 are mounted before and after the location of the throttle 6 is because the engine air flow is the cylinder intake air flow supplied to the cylinder 2-1 and the cylinder intake air flow is equal to the throttle passing air flow.

As an example, the MAF sensor 5-3 measures and detects the air density of fresh air which is combined with the EGR gas and passes the intake manifold, and the intake pressure sensor 5-4 measures and detects the pressure of the EGR gas which flows toward the intake manifold.

The combined function apparatus includes an active purge system (AFS) 9-1, an exhaust gas recirculation (EGR) system 9-2, and a continuously variable valve duration (CVVD) system 9-3.

As an example, the AFS 9-1 traps the evaporation gas of fuel to purge the evaporation gas to be sent to the engine through the intake system, and a purge control solenoid valve (PCSV) 9-1A is mounted on the intake manifold to perform a purging operation.

As an example, the EGR system 9-2 sends some exhaust gases of the exhaust gases to the intake system as the EGR gas to supply them to the engine, and includes the LP-EGR system to extract and use the EGR gas from the rear of the turbo charger 7 compared to a high pressure (HP)-EGR system as a high pressure type which extracts and utilizes the EGR gas from the front of the turbo charger 7.

As an example, the CVVD system 9-3 controls a valve duration in conjunction with a continuously variable valve timing (CVVT) system and also controls valve open/close time points independently, independently performing a valve timing control for setting optimal valve open/close time points.

The ECU 10 constructs a network with a model map 11, a data processor 13, and an engine system 1 through controller area network or control area network (CAN) communication to transmit and receive data.

To this end, the ECU 10 is operated as a central processing unit which is composed of a memory which stores logic for performing the engine air flow calculation control (S30-1 to S70) with a programming, a calculation unit of calculation, and an output unit of generating a signal, and outputs the engine air flow calculation value as fresh air charge data (a). In the instant case, although the memory, the calculation unit, and the output unit are not illustrated, it is obvious that they are basic components.

Furthermore, the ECU 10 includes a data processor together with the model map 11 which includes an intake manifold pressure model map 11A, an air flow model map 11B, an EGR air flow model map 11C, and an active purge air flow model map 11D.

As an example, the air flow model map 11B matches the air flow of the HFM sensor 5-1 and the air pressure of the MAP sensor 5-2 with the separately constructed air flow and pressure data to provide the corresponding air flow and pressure to the ECU 10; the EGR air flow model map 11C matches the EGR gas supplied to the intake manifold to provide the corresponding EGR gas amount to the ECU 10; and the active purge air flow model map 11D matches the purge air flow supplied to the intake manifold to provide the corresponding purge air flow to the ECU 10.

As an example, the data processor 13 detects engine RPM/torque/load, HPM/MAF air flows, MAP/boost/EGR/active purge/fresh air pressures, CVVD/EGR/AFS operation signals, and the like from various sensors mounted in the engine system 1, and provides them to the ECU 10 as air flow calculation information and system information. Accordingly, the data processor 13 may be a separate apparatus but the HCU 20 may be applied.

The HCU 20 controls the overall operation of the engine 2, and receives the fresh air charge data (a) of the ECU 10 via CAN communication to output engine control data (b) to control the combustion of the engine 2.

Hereinafter, the method for preventing the engine air flow calculation error will be described in detail with reference to FIGS. 2 to 13. In the instant case, the control subject of the air flow calculation is the ECU 10, and the control subject of the engine combustion control is the HCU 20, separately but the ECU 10 may perform the role of the HCU 20 together. Furthermore, the control target is the engine system 1 but an apparatus related to the air flow calculation for the cylinder 2-1 of the engine 2.

First, the ECU 10 performs detecting the engine system information (S10) and determining the engine operation area (S20).

Referring to FIG. 2, the ECU 10 uses, as input data, engine RPM, CVVD/EGR/AFS operation signals, EGR air flow/active purge air flow supply signals, and the like via CAN with the data processor 13, reads, as the air flow calculation information, an HFM signal for the measurement pressure of the HFM sensor 5-1, an MAP signal for the measurement pressure of the MAP sensor 5-3, an MAF signal for the measurement air density of the MAF sensor 5-3, an intake pressure signal for the measurement intake pressure of the intake pressure sensor 5-4, and a TPS signal of the throttle 6 from the input data, and reads, as the system information, engine RPM/torque/load signals, boost/EGR/active purge/fresh air pressure signals, CVVD/EGR/AFS operation signals, and the like which are detected from the conventional various engine sensors, performing the detecting of the engine system information (S10).

Subsequently, the ECU 10 performs the determining of the engine operation area (S20) by confirming the data about the engine RPM, the engine load, the EGR supply control, and the active purge control from the system information. In the instant case, the engine operation area may be classified into low load, medium load, and high load.

Thereafter, the ECU 10 performs the engine air flow calculation control (S30-1 to S70) including confirming the sensor measurement deviation generation area (S30-1), classifying the medium/high load areas (S40-1) and the low load area (S40-2) using the engine load (S40), performing the air flow calculation control accompanied by the measurement air flow compensation by entering an air flow compensation control (S50), performing the air flow calculation control which applies the measurement pressure by entering the MAP air flow control (S60), and performing the air flow calculation control which applies the measurement air flow by entering the HFM air flow control (S70).

Hereinafter, the sensor measurement deviation generation area is defined as a separate operation area differentiated from the operation areas of the low load area and the medium/high load areas. Furthermore, the air flow compensation control (S50) is an air flow calculation control accompanied by the measurement air flow compensation of the HFM sensor to perform the air flow calculation in the sensor measurement deviation generation area; the MAP air flow control (S60) is a medium/high load air flow control which performs the air flow calculation with the measurement pressure of the MAP sensor; and the HFM air flow control (S70) is a low load air flow control which performs the air flow calculation with the measurement air flow of the HFM sensor in the low load area.

The sensor measurement deviation generation area (S30-1) is determined through a torque difference or an air flow difference.

Figure 3:
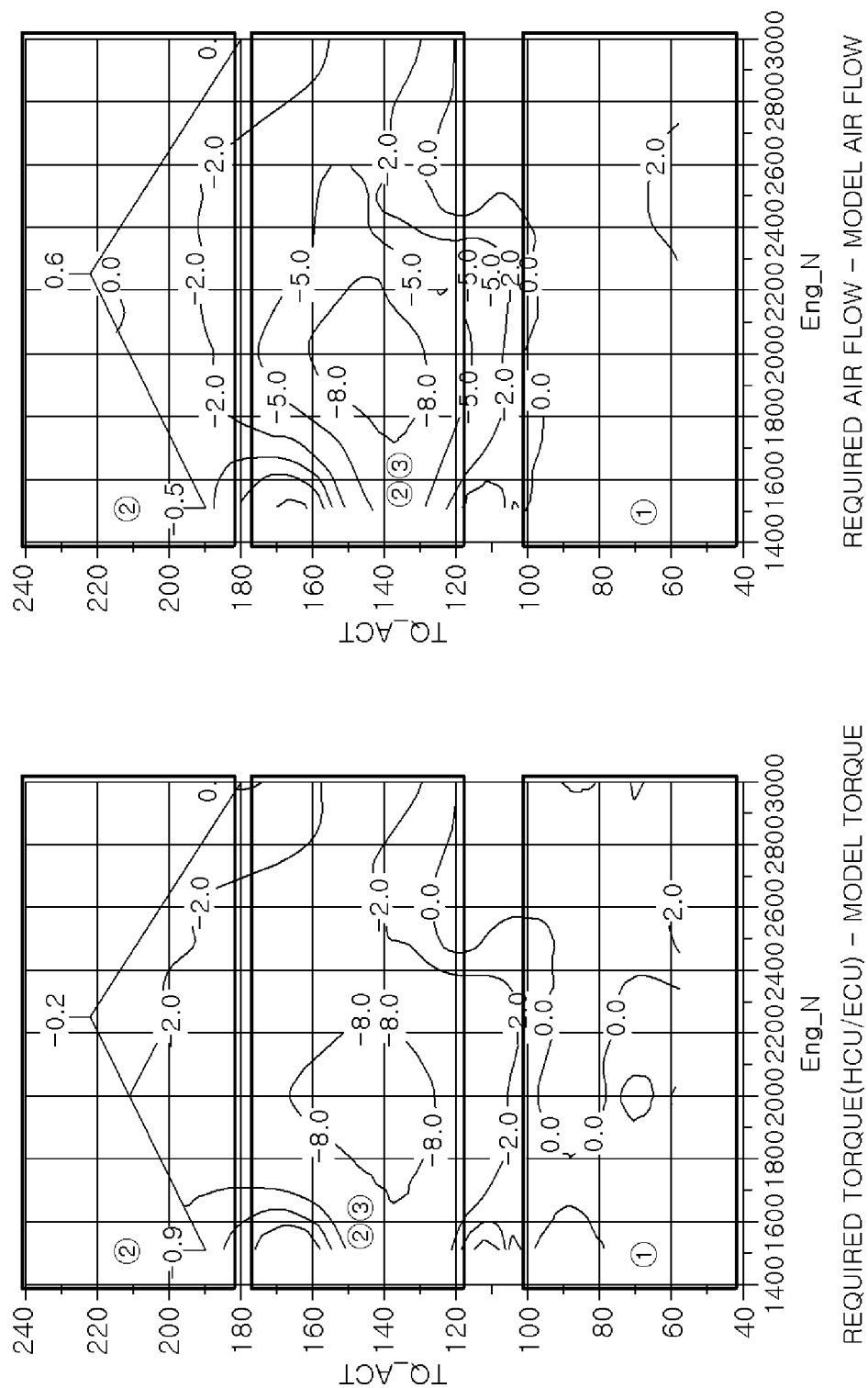
FIG. 3 is a line diagram illustrating a difference between engine torques and a difference between engine air flows which may be generated upon the generation of the sensor measurement deviation according to various exemplary embodiments of the present invention.

Referring to the line diagram illustrating a difference between the engine torques and the line diagram illustrating a difference between the engine air flows illustrated in FIG. 3, the line diagram illustrating the difference between the engine torques is illustrated so that a difference between the model torque and the required torque in areas ②/③ affected by the sensor measurement deviation compared to areas ① and ② in an engine RPM Eng_N (or an engine speed) versus an engine torque TO_ACT may be seen, and the line diagram illustrating the difference between the engine air flows is illustrated so that a difference between the model air flow and the required air flow in the areas ②/③ affected by the sensor measurement deviation compared to areas ① and ① in the engine RPM Eng_N (or an engine speed) versus the engine torque TO_ACT may be seen.

Accordingly, the following sensor measurement deviation generation area confirmation formula is applied to the sensor measurement deviation generation area (S30-1).

Sensor measurement deviation generation area confirmation formula=$T_{diff} > t_{threshold}$
where "$T_{diff}$" is ±10% $t_{threshold}$ as the sensor measurement deviation value, "$t_{threshold}$" refers to the sensor measurement deviation threshold and is one of a torque difference value obtained by subtracting the model torque from the required torque (that is, the required torque−the model torque) and an air flow difference value obtained by subtracting the model air flow from the required air flow (that is, the required air flow−the model air flow), and ">" refers to an inequality sign representing the size relationship between the two values. In the instant case, the model torque and the model air flow are derived or confirmed as matching values in which the measurement air flow of the HFM sensor 5-1 is matched using the EGR air flow model and/or the active purge air flow model as the models.

As a result, if the sensor measurement deviation value $T_{diff}$ is greater than the sensor measurement deviation threshold value $t_{threshold}$ in the sensor measurement deviation generation area (S30-1), the ECU 10 enters the air flow compensation control (S50) to perform the air flow calculation. In the instant case, the air flow compensation control (S50) is described in detail with reference to FIG. 8 and FIG. 9.

On the other hand, if the sensor measurement deviation confirmation value $T_{diff}$ is smaller than the sensor measurement deviation threshold value $t_{threshold}$ in the sensor measurement deviation generation area (S30-1), the ECU 10 switches to the classifying of the engine load (S40).

The determining of the engine load (S40) is classified into the medium/high load areas (S40-1) and the low load area (S40-2). In the instant case, since the engine load is basically determined as the air flow introduced into the cylinder 2-1 of the engine 2, the value of the engine load is high when a large air amount is introduced and is low when a small air amount is introduced. Accordingly, the medium/high load areas (S40-1) may be defined as an engine operation area in which the introduced air flow is much required to increase the engine RPM and the engine torque compared to the low load area (S40-2). However, the load areas are classified based on the engine RPM which is commonly applied in the vehicle field, and an idle RPM to 2,000 RPM may be defined as the low load and more than 2,000 RPM may be defined as the medium/high loads.

As an example, the following engine load confirmation formulas are applied to the medium/high load areas (S40-1) and the low load area (S40-2), respectively.

Medium/high load confirmation formula=$L_{eng} > A_{threshold}$
Low load confirmation formula=$L_{eng} < A_{threshold}$
Where "$L_{eng}$" refers to a current engine load calculated by the introduced air flow, "$A_{threshold}$" refers to the engine load threshold and is a set engine load which classifies the low load and the medium/high loads by being matched with the required air flow, and ">, <" refers to the inequality sign representing the size relationship between the two values.

As a result, the ECU 10 performs the air flow calculation by use of the case where the current engine load ($L_{eng}$) is greater than the engine load threshold ($A_{threshold}$) as the medium/high loads to enter the MAP air flow control (S60). On the other hand, the ECU 10 performs the air flow calculation by use of the case where the current engine load ($L_{eng}$) is smaller than the engine load threshold ($A_{threshold}$) as the low load to enter the HFM air flow control (S70).

In the instant case, the MAP air flow control (S60) is described in detail with reference to FIG. 10, and FIG. 11, and the HFM air flow control (S70) is described in detail with reference to FIG. 12, and FIG. 13.

Figure 4:
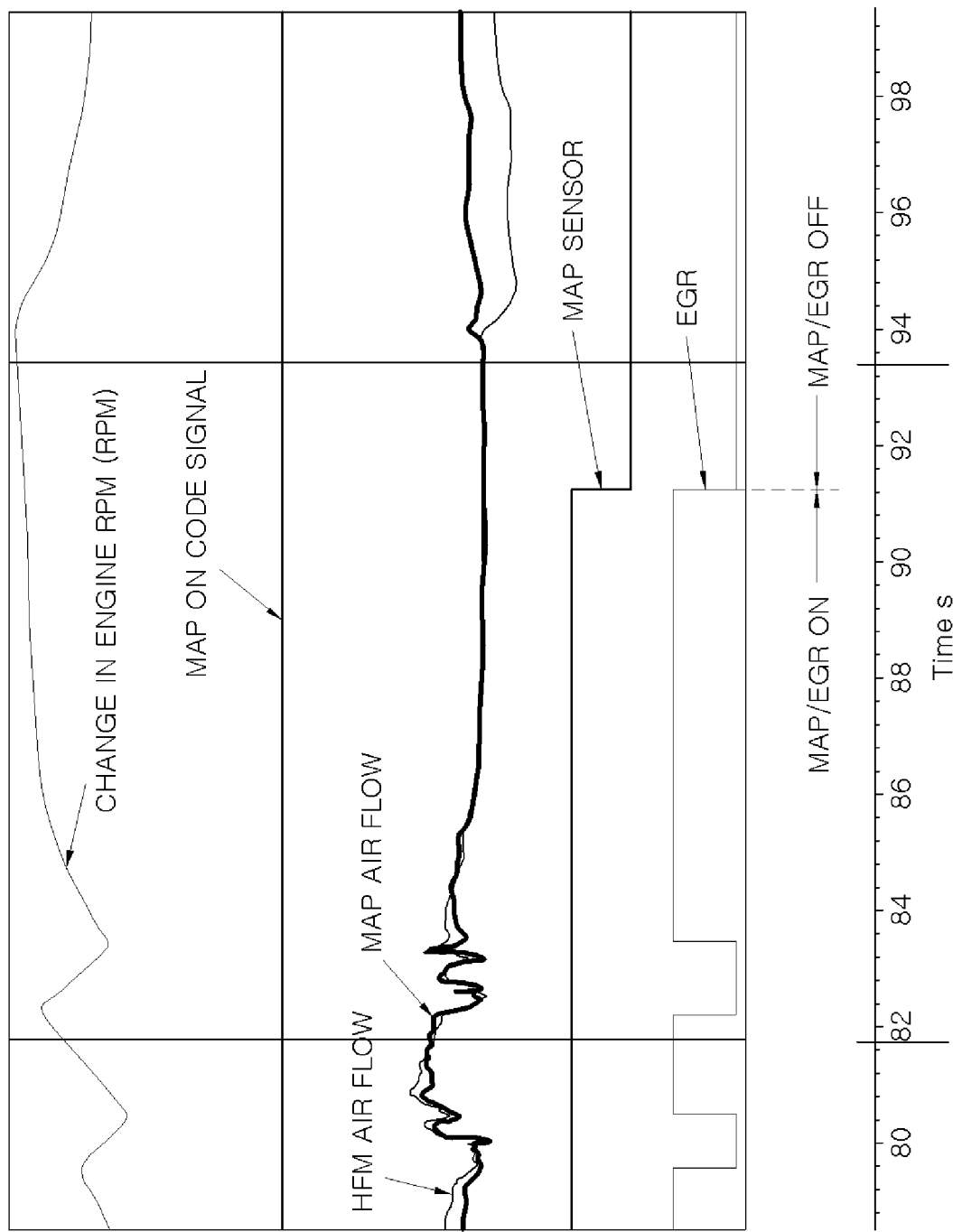
FIG. 4 is a diagram illustrating an operation state of an engine system according to various exemplary embodiments of the present invention in which an MAP sensor is used as a main air flow sensor in medium/high load areas and an operation of an EGR system is connected.
Figure 5:
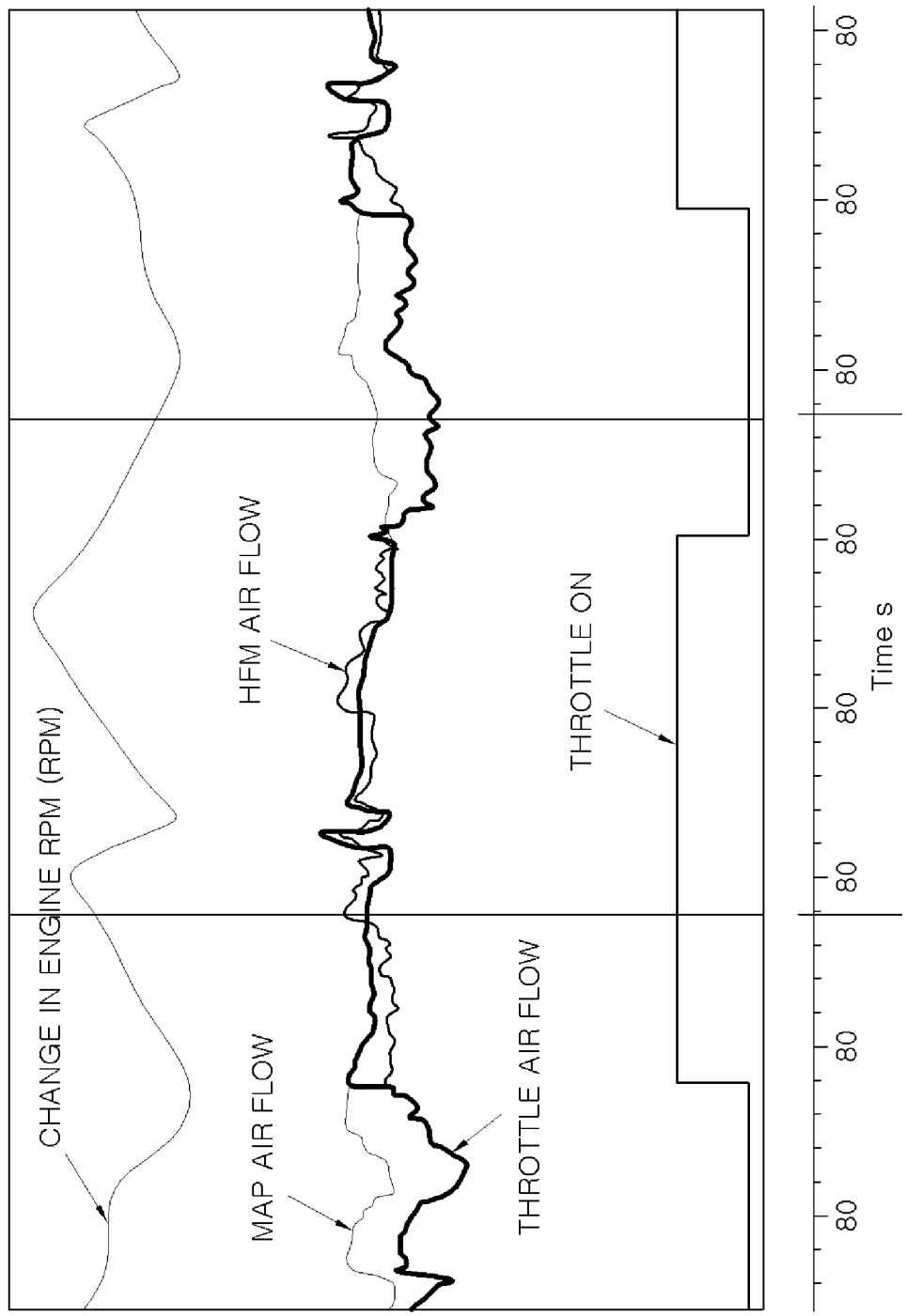
FIG. 5 is a diagram illustrating an operation state of the engine system according to various exemplary embodiments of the present invention in which the MAP sensor is used as the main air flow sensor in the medium/high load areas and a throttle air flow is used as an input air flow to determine an intake manifold model pressure.

FIG. 4 and FIG. 5 illustrate the operating state of the engine system 1 during the MAP air flow control (S60) applied to the medium/high load areas (S40-1).

Referring to FIG. 4, the MAP ON CODE signal=1 is set so that the EGR operation (that is, the EGR ON) is connected to the normal operation state of the MAP sensor 5-2 (that is, the MAP ON) such that the MAP sensor 5-2 is used as the main air flow sensor, prohibiting the EGR operation from being performed with the abnormality of the MAP sensor (that is, the MAP OFF or the MAP false). Accordingly, the HFM air flow and the MAP air flow may be changed so that the HFM sensor 5-1 is not used in a process of calculating the air flow by following each other in the normal operation state of the MAP sensor, and this may be seen from the engine RPM change line diagram in which the fluctuation or hunting phenomenon of the engine RPM is largely decreased compared to the conventional one.

Referring to FIG. 5, the MAP sensor 5-2 is used as the main air flow sensor such that the throttle air flow is used as the input air flow for determining the intake manifold model pressure, and the throttle ON of the throttle 6 according to the change in the engine RPM (that is, the throttle open due to the increase in the TPS) may be seen by the throttle air flow closely following the HFM air flow and the MAP air flow.

Finally, the ECU 10 performs the outputting of the engine air flow (S80) to output the engine air flow calculated by one of the air flow compensation control (S50), the MAP air flow control (S60), and the HFM air flow control (S70). Accordingly, the HCU 20 controls the engine through the engine control (S90) in cooperation with the ECU 10. In the instant case, the procedure of calculating the engine air flow in the ECU 10 and the procedure of controlling the engine in the HCU 20 are out of the scope of the present invention and thus descriptions thereof are omitted.

Referring to FIG. 2, the ECU 10 outputs the determined engine air flow as the fresh air charge data (a), and the HCU 20 receives the fresh air charge data (a) to generate engine control data (b) to control the combustion of the engine 2.

Figure 6:
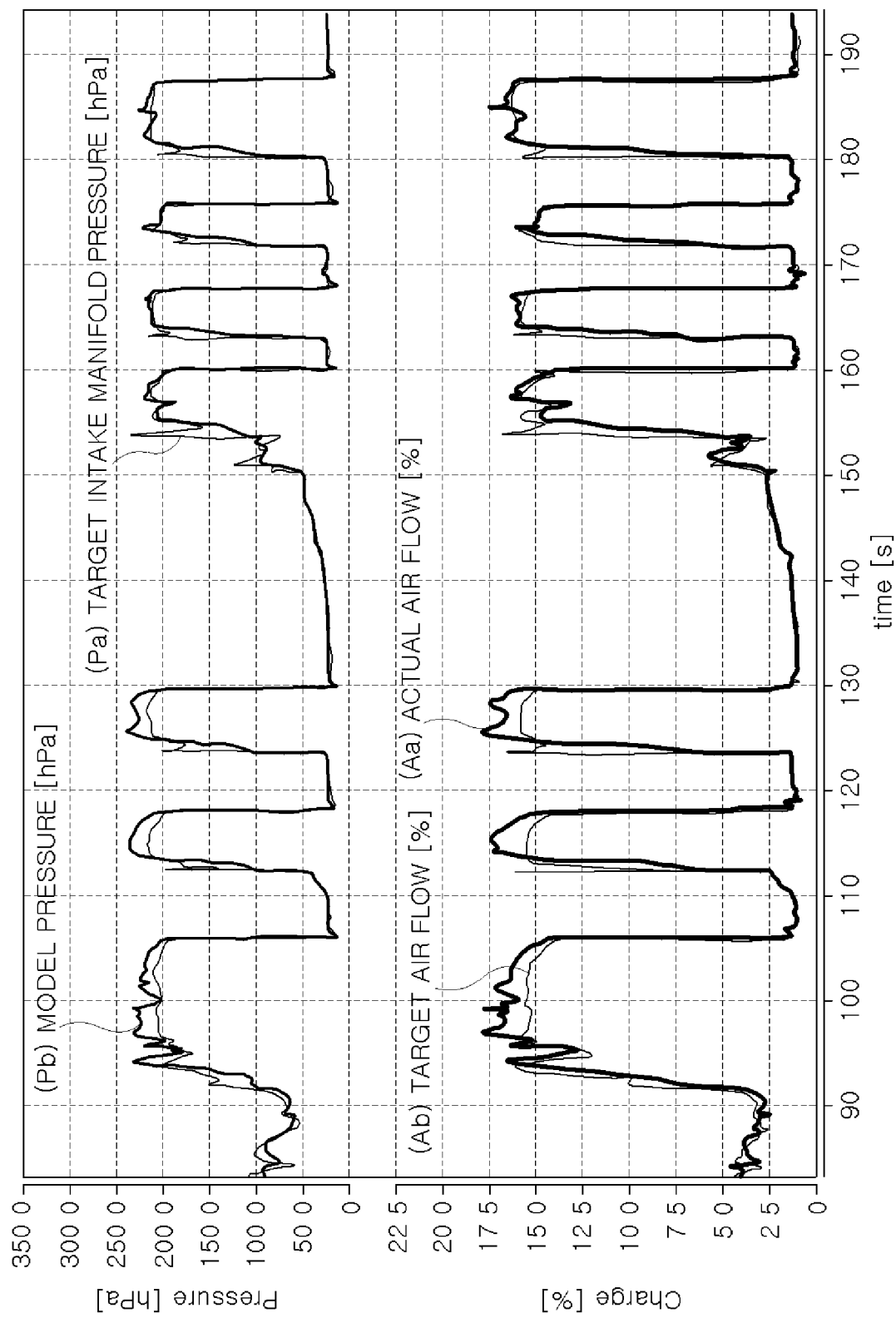
FIG. 6 is a line diagram illustrating a difference between intake manifold pressures and a difference between air flows which may be generated in the engine operation area according to various exemplary embodiments of the present invention.

Referring to FIG. 6, by effectively dealing with the pressure difference between an intake manifold model pressure $P_b$ and an target intake manifold pressure $P_a$ and the air flow difference between the intake manifold actual air flow A and the intake manifold target air flow $A_b$, it is possible to allow the model pressure $P_b$ to follow the target pressure $P_a$ to be matched therewith, and to allow the actual air flow A to follow the target air flow $A_b$ to be matched therewith.

Figure 7:
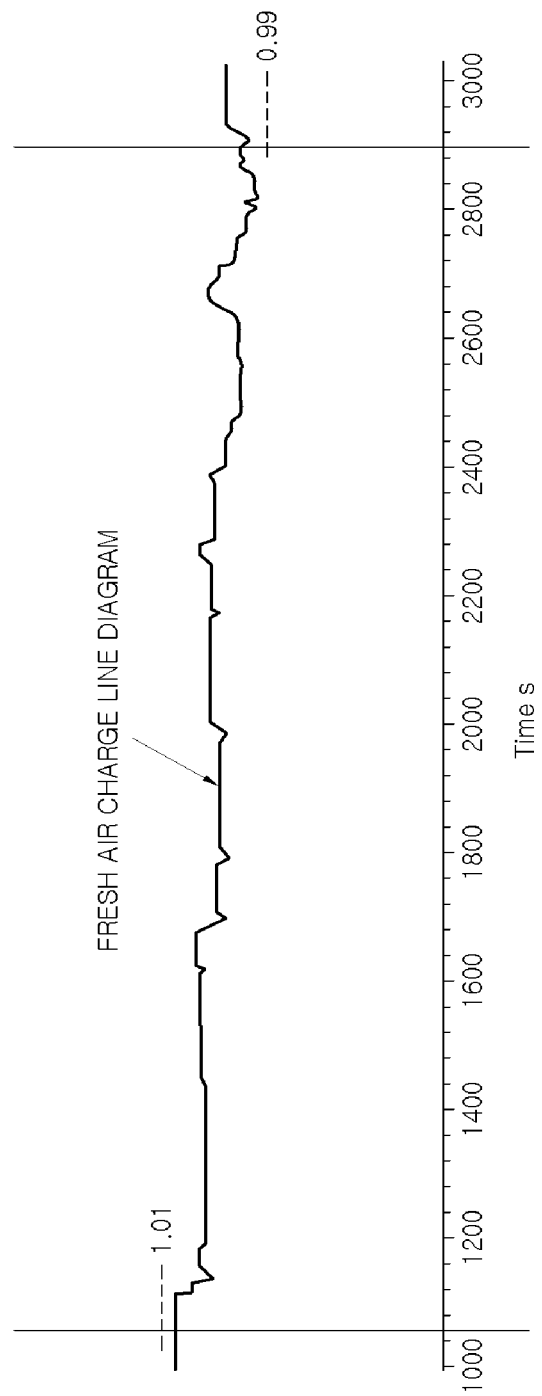
FIG. 7 is a test line diagram illustrating the confirmation results of a fuel path learning value obtained by the method for preventing the engine air flow calculation error after a vehicle to which the engine system according to various exemplary embodiments of the present invention is applied travels a long distance.

FIG. 7 is a test diagram confirming with simulation that the model pressure $P_b$ follows the target pressure $P_a$ to be matched therewith and the actual air flow A follows the target air flow $A_b$ to be matched therewith, and the test line diagram illustrates that the confirmation result of the fuel path learning value obtained through the long-distance traveling of a vehicle controlling the engine system 1 in connection with the ECU 10 and the HCU 20 is proved as a fuel learning value with a level of 1.01 to 0.99. In the instant case, the fresh air charge line diagram means the cylinder charging amount of the engine 2 which follows the ideal fuel learning value of 1.

Figure 8:
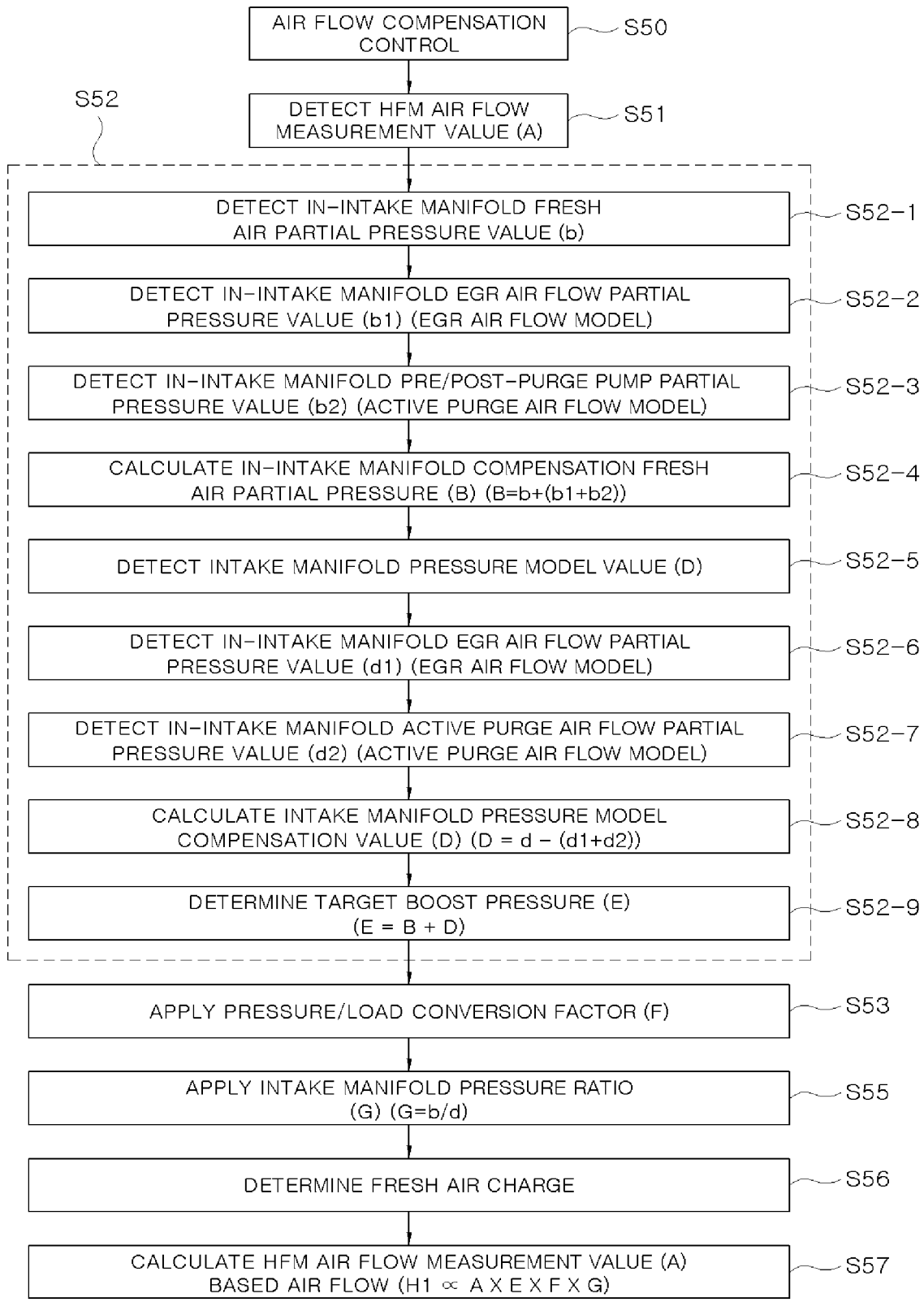
FIG. 8 is a flowchart illustrating an air flow compensation control in which a boost pressure is compensated in the method for preventing the engine air flow calculation error according to various exemplary embodiments of the present invention.
Figure 9:
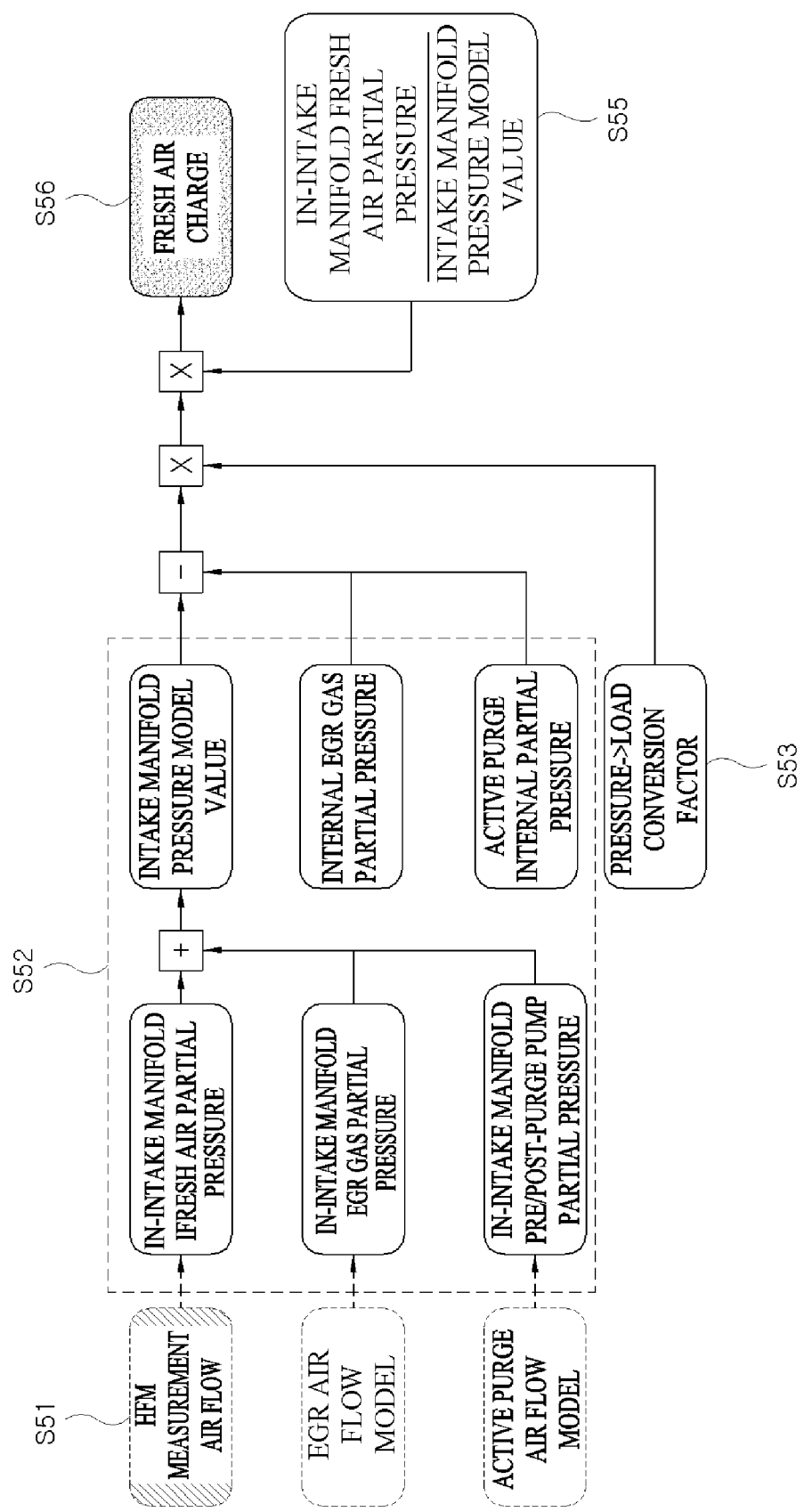
FIG. 9 is a block diagram illustrating the air flow compensation control according to various exemplary embodiments of the present invention.

Meanwhile, FIG. 8 and FIG. 9 illustrate detailed procedures for the air flow compensation control (S50).

Referring to FIG. 8, the air flow compensation control (S50) includes detecting the HFM air flow measurement value (S51), determining the boost pressure compensation (S52), and determining the HFM engine air flow compensation (S53/S55 to S57).

As an example, the detecting of the HFM air flow measurement value (S51) is performed by confirming the measurement air flow of the HFM sensor 5-1 in the ECU 10. The determining of the boost pressure compensation (S52) is performed by determining the target boost pressure in the ECU 10 by applying the EGR air flow model and the active purge air flow model to an in-intake manifold fresh air partial pressure and an intake manifold pressure model value of the intake system 3.

The determining of the boost pressure compensation (S52) includes: detecting an in-intake manifold fresh air partial pressure value (S52-1), detecting an in-intake manifold EGR air flow partial pressure value (S52-2), detecting an in-intake manifold pre/post-purge pump partial pressure value (S52-3), determining an in-intake manifold compensation fresh air partial pressure (S52-4), detecting an intake manifold pressure model value (S52-5), detecting an in-intake manifold EGR air flow partial pressure (S52-6), detecting an in-intake manifold active purge air flow partial pressure (S52-7), determining an intake manifold pressure model compensation value (S52-8), and determining a target boost pressure (S52-9).

Referring to the block diagram for the determining of the boost pressure compensation (S52) illustrated in FIG. 9, the detecting of the in-intake manifold fresh air partial pressure value (S52-1) confirms, as the in-intake manifold fresh air partial pressure value, a matching value for a fresh air density measurement value of the MAF sensor 5-3 or a direct measurement value of the air pressure sensor in the ECU 10. The detecting of the in-intake manifold EGR air flow partial pressure value (S52-2) confirms the HFM measurement air flow as the in-intake manifold EGR air flow partial pressure value obtained by being matched with the EGR air flow model map 11C in the ECU 10. The detecting of the in-intake manifold pre/post-purge pump partial pressure value (S52-3) confirms the HFM measurement air flow as the in-intake manifold pre/post-purge pump partial pressure value obtained by being matched with the active purge air flow model map 11D in the ECU 10.

Accordingly, the determining of the in-intake manifold compensation fresh air partial pressure (S52-4) is performed by applying the following formula of determining the in-intake manifold compensation fresh air partial pressure.

In-intake manifold compensation fresh air partial pressure determination formula: $B = b + b1 + b2$)

Where "B" refers to the in-intake manifold compensation fresh air partial pressure value, "b" refers to the in-intake manifold fresh air partial pressure value, "b1" refers to the in-intake manifold EGR air flow partial pressure value, "b2" refers to the in-intake manifold pre/post-purge pump partial pressure value, and "+" refers to a sum symbol of the two values.

Accordingly, the in-intake manifold compensation fresh air partial pressure value (B) is determined by adding the sum of the in-intake manifold EGR air flow partial pressure value (b1) and the in-intake manifold pre/post-purge pump partial pressure value (b2) to the in-intake manifold fresh air partial pressure value (b).

Subsequently, the detecting of the intake manifold pressure model value (S52-5) confirms the HFM measurement air flow as the intake manifold pressure model value obtained by being matched with the intake manifold pressure model map 11A in the ECU 10. The detecting of the in-intake manifold EGR air flow partial pressure value (S52-6) confirms the HFM measurement air flow as the in-intake manifold EGR air flow partial pressure value obtained by being matched with the EGR air flow model map 11C in the ECU 10. The detecting of the in-intake manifold active purge air flow partial pressure value (S52-7) confirms the HFM measurement air flow as the in-intake manifold active purge air flow partial pressure value obtained by being matched with the active purge air flow model map 11D in the ECU 10.

Accordingly, the determining of the intake manifold pressure model compensation value (S52-8) is performed by applying an intake manifold pressure model compensation determination formula below.

Intake manifold pressure model compensation determination formula: $D = d - (d1 + d1)$ where "D" refers to the intake manifold pressure model compensation value, "d" refers to the intake manifold pressure model value, "d1" refers to the in-intake manifold EGR air flow partial pressure value, "d2" refers to the in-intake manifold active purge air flow partial pressure value, and "−" refers to a minus symbol of the two values.

Accordingly, the intake manifold pressure model compensation value (D) is determined by subtracting the sum of the in-intake manifold EGR air flow partial pressure value (d1) and the in-intake manifold active purge air flow partial pressure value (d2) from the intake manifold pressure model value (d).

Finally, a target boost pressure relationship formula below is applied to the determining of the target boost pressure (S52-9).

Target boost pressure relationship formula: $E = B + D$

Where "E" refers to the target boost pressure value, "B" refers to the in-intake manifold compensation fresh air partial pressure value, and "D" refers to the intake manifold pressure model compensation value.

Accordingly, the target boost pressure value (E) is determined by summing the in-intake manifold compensation fresh air partial pressure value (B) and the intake manifold pressure model compensation value (D).

As an example, the determining of the HFM engine air flow compensation (S53, S55 to S57) includes applying a pressure/load conversion factor (S53), applying an intake manifold pressure ratio (S55), determining a fresh air charge (S56), and determining the HFM air flow measurement value based compensation air flow (S57).

Referring to the block diagram for the determining of the fresh air charge (S56) illustrated in FIG. 9, the applying of the pressure/load conversion factor (S53) is performed by applying an engine load conversion formula in the ECU 10, and the applying of the intake manifold pressure ratio (S55) is performed by applying an intake manifold pressure ratio conversion formula in the ECU 10.

Engine load conversion formula: engine Load=F×E

Intake manifold pressure ratio conversion formula: G=b/d

Where "E" refers to the target boost pressure value, and "F" refers to the pressure/load conversion factor to which a number (for example, 0.1 to 1) or a ratio (for example, 10 to 100%) is applied and is confirmed by matching the boost pressure of the intake manifold pressure model map 11A with the engine load of the air flow model map 11B to match the pressure size of the target boost pressure value (E) with the load size of the engine 2 to represent the same engine state. Furthermore, "G" refers to the intake manifold pressure ratio, "b" refers to the in-intake manifold fresh air partial pressure value, "d" refers to the intake manifold pressure model value, and "/" refers to a division symbol of the two values.

As a result, the engine load (F×E) is converted by being multiplied by the intake manifold pressure ratio (G), and the engine load is confirmed or derived by the fresh air charge (S56) by matching the air flow model map 11B with the engine load in the ECU 10.

Finally, the determining of the HFM air flow measurement value based compensation air flow (S57) is performed based on the fresh air charge (S56) in the ECU 10 such that the HFM air flow measurement value based compensation air flow determination value is obtained by the following function.

HFM compensation engine air flow determination formula: H1∝A×E×F×G

Here, "∝" refers to a symbol representing the functional relationship, "H1" refers to the HFM air flow measurement value based compensation air flow determination value, "A" refers to the HFM air flow measurement value, "E" refers to the engine load, "F" refers to the pressure/load conversion factor, "G" refers to the intake manifold pressure ratio, and "×" refers to a multiplicative symbol of the two values.

Accordingly, the ECU 10 obtains the HFM air flow measurement value based compensation air flow determination value based on the existing logic, and utilizes the value as the HFM air flow to generate and then provide the fresh air data (a) to the HCU 20.

Figure 10:
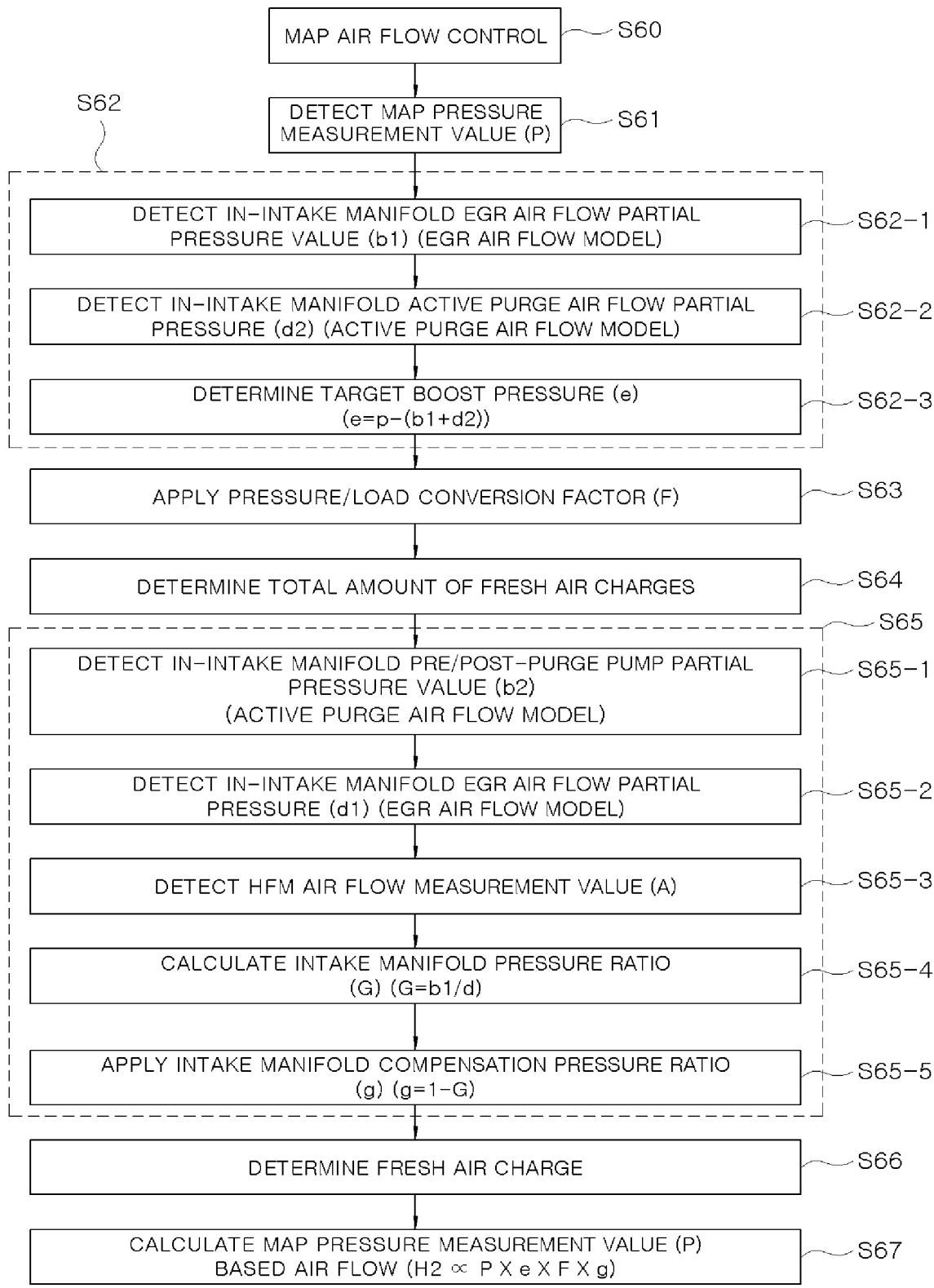
FIG. 10 is a flowchart illustrating an MAP air flow control in the method for preventing the engine air flow calculation error according to various exemplary embodiments of the present invention.
Figure 11:
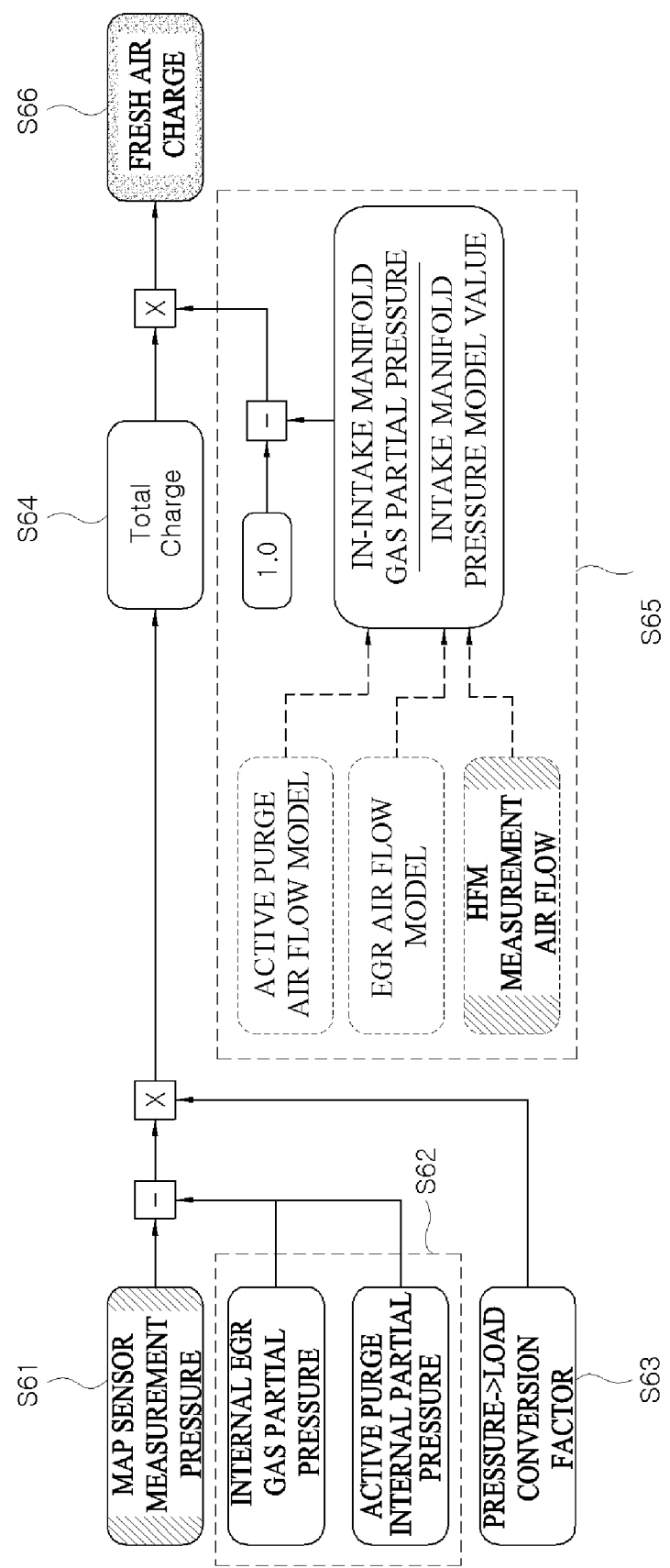
FIG. 11 is a block diagram illustrating the MAP air flow control according to various exemplary embodiments of the present invention.

Meanwhile, FIG. 10, and FIG. 11 illustrate detailed procedures for the MAP air flow control (S60).

Referring to FIG. 10, the MAP air flow control (S60) includes detecting the MAP pressure measurement value (S61), determining the boost pressure (S62), applying the pressure/load conversion factor (S63), determining the total amount of the fresh air charges (S64), compensating the fresh air charge (S65), determining the fresh air charge (S66), and determining the MAP pressure measurement value based engine air flow (S67).

As an example, the detecting of the MAP pressure measurement value (S61) is performed by confirming the measurement pressure of the MAP sensor 5-2 in the ECU 10. The determining of the boost pressure (S62) is performed by applying the exhaust gas recirculation (EGR) air flow model and the active purge air flow model to the intake manifold pressure model value to determine the resulting value as the target boost pressure in the ECU 10.

The determining of the boost pressure (S62) includes detecting the in-intake manifold EGR air flow partial pressure value (S62-1), detecting the in-intake manifold active purge air flow partial pressure value (S62-2), and determining the target boost pressure value (S62-3).

As an example, the detecting of the in-intake manifold EGR air flow partial pressure value (S62-1) confirms the HFM measurement air flow as the in-intake manifold EGR air flow partial pressure value obtained by being matched with the EGR air flow model map 11C in the ECU 10. The detecting of the in-intake manifold active purge air flow partial pressure value (S62-2) confirms the HFM measurement air flow as the in-intake manifold active purge air flow partial pressure value obtained by being matched with the active purge air flow model map 11D in the ECU 10.

Referring to the block diagram for the determining of the total amount of fresh air charges illustrated in FIG. 11, the determining of the total amount of fresh air charges (S64) is performed by applying the pressure/load conversion factor (S63) to the determining of the target boost pressure (S62-3) determined through the determining of the boost pressure (S62).

As an example, a target boost pressure relationship formula below is applied the determining of the target boost pressure (S62-3), and an engine load conversion formula is applied to the applying of the pressure/load conversion factor (S63) in the ECU 10.

Target boost pressure relationship formula: e=P−(b1+d2)

Engine load conversion formula: engine Load=F×e where "e" refers to the target boost pressure value, "P" refers to the MAP pressure measurement value, "b1" refers to the in-intake manifold EGR air flow partial pressure value, "d2" refers to the in-intake manifold active purge air flow partial pressure value, and "F" refers to the pressure/load conversion factor to which a number (for example, 0.1 to 1) or a ratio (for example, 10 to 100%) is applied and is confirmed by matching the boost pressure of the intake manifold pressure model map 11A with the engine load of the air flow model map 11B to match the pressure size of the target boost pressure value (E) with the load size of the engine 2 to represent the same engine state.

Accordingly, the target boost pressure value (e) is determined by subtracting the sum of the in-intake manifold EGR air flow partial pressure value (b1) and the in-intake manifold active purge air flow partial pressure value (d2) from the MAP pressure measurement value (P). Furthermore, the engine load is determined by multiplying the target boost pressure value (E) by the pressure/load conversion factor (F).

As a result, the total amount of fresh air charges (S64) is confirmed or derived by matching the air flow model map 11B with the engine load in the ECU 10.

The compensating of the fresh air charge (S65) includes detecting the in-intake manifold pre/post-purge pump partial pressure value (S65-1), detecting the in-intake manifold EGR air flow partial pressure value (S65-2), detecting the HFM air flow measurement value (S65-3), determining the intake manifold pressure ratio (S65-4), and applying the intake manifold compensation pressure ratio (S65-5).

Referring to the block diagram for the compensating of the fresh air charge illustrated in FIG. 11, the detecting of the in-intake manifold pre/post-purge pump partial pressure value (S65-1) confirms the HFM measurement air flow as the in-intake manifold pre/post-purge pump partial pressure value obtained by being matched with the active purge air flow model map 11D in the ECU 10. The detecting of the in-intake manifold EGR air flow partial pressure value (S62-2) confirms the HFM measurement air flow as the in-intake manifold EGR air flow partial pressure value obtained by being matched with the EGR air flow model map 11C in the ECU 10. The HFM air flow measurement value (S65-3) confirms the HFM measurement air flow in the ECU 10.

Subsequently, the determining of the intake manifold pressure ratio (S65-4) is performed by applying the intake manifold pressure ratio conversion formula in the ECU 10, and the applying of the intake manifold compensation pressure ratio (S65-5) is performed by applying an intake manifold compensation pressure ratio conversion formula in the ECU 10.

Intake manifold pressure ratio conversion formula: G=b1/d

Intake manifold compensation pressure ratio conversion formula: g=y−G where "G" refers to the intake manifold pressure ratio, "b" refers to the in-intake manifold EGR air flow partial pressure value, "d" refers to the intake manifold pressure model value, "g" refers to the intake manifold compensation pressure ratio, and "y" refers to the compensation constant and a number 1 (integer) is applied thereto.

As a result, the total amount of fresh air charges (or engine load=F×E) (S64) is converted into the engine load by being multiplied by the intake manifold compensation pressure ratio (g), and the engine load is confirmed or derived by the fresh air charge (S66) by matching the air flow model map 11B with the engine load in the ECU 10.

Finally, the determining of the MAP pressure measurement value based air flow (S67) is performed based on the fresh air charge (S66) in the ECU 10 such that the MAP pressure measurement value based air flow calculation value is obtained by the following function.

$$H2 \propto P \times e \times F \times g$$

where "∝c" refers to a symbol representing the functional relationship, "H2" refers to the HFM air flow measurement value based air flow calculation value, "P" refers to the MAP pressure measurement value, "e" refers to the engine load, "F" refers to the pressure/load conversion factor, "G" refers to the compensation intake manifold pressure ratio, and "x" refers to a multiplication symbol of the two values.

Accordingly, the ECU 10 obtains the MAP pressure measurement value based air flow determination value based on the conventional logic, and utilizes the value as the MAP air flow to generate and then provide the fresh air charge data (a) to the HCU 20.

Figure 12:
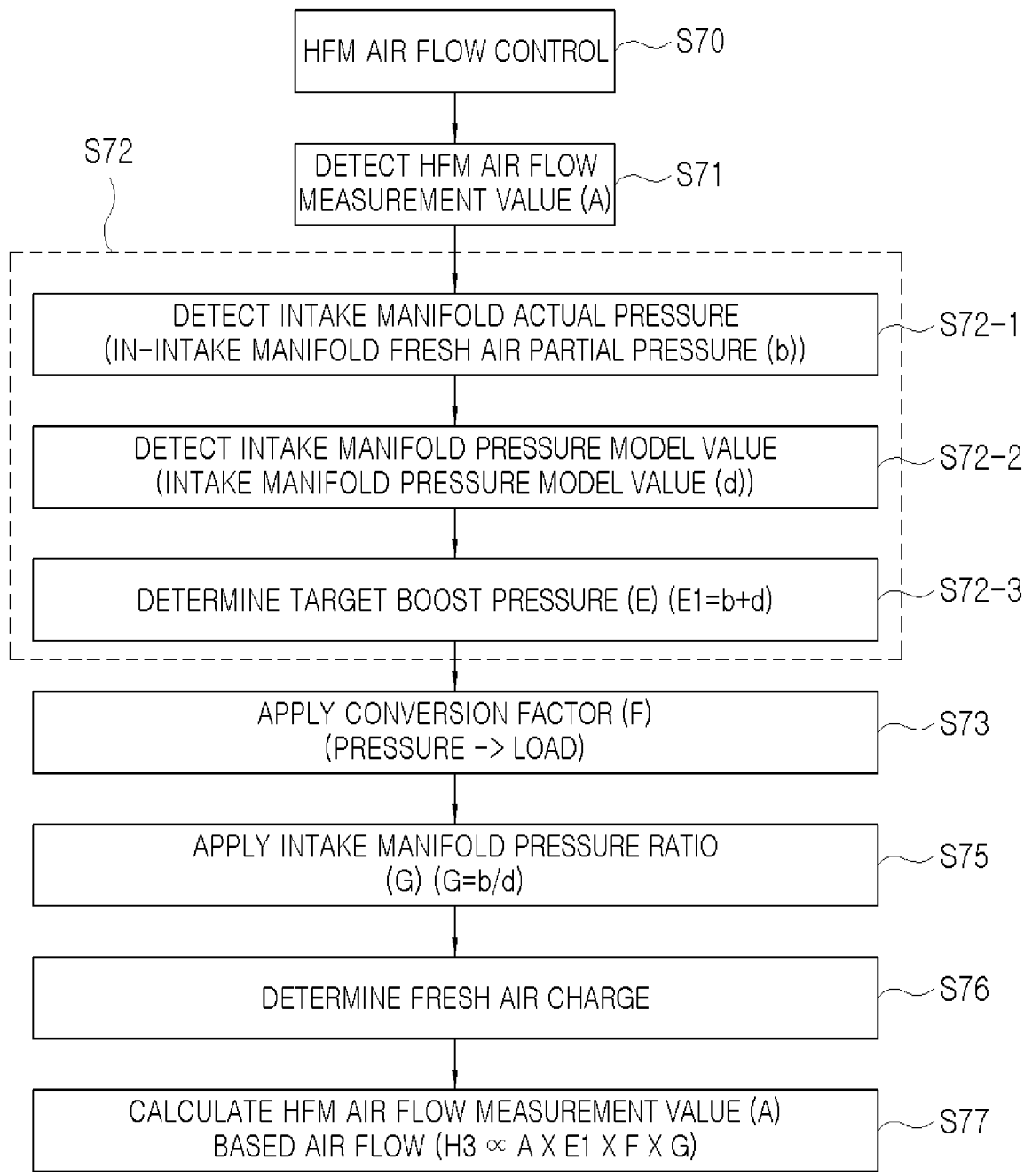
FIG. 12 is a flowchart illustrating an HFM air flow control in the method for preventing the engine air flow calculation error according to various exemplary embodiments of the present invention.

Meanwhile, FIG. 12, and FIG. 13 illustrate detailed procedures for the HFM air flow control (S70).

Referring to FIG. 12, the HFM air flow control (S70) includes detecting the HFM air flow measurement value (S71), determining the boost pressure (S72), and determining the HFM engine air flow (S53/S55 to S57).

As an example, the detecting of the HFM air flow measurement value (S71) is performed by confirming the measurement air flow of the HFM sensor 5-1 in the ECU 10. The determining of the boost pressure (S52) is performed by determining the resulting value as the target boost pressure in the ECU 10 by applying the in-intake manifold fresh air partial pressure and the intake manifold pressure model value of the intake system 3.

The determining of the boost pressure (S52) includes detecting the in-intake manifold fresh air partial pressure value (S72-1), detecting the intake manifold pressure model value (S72-2), and determining the target boost pressure (S72-3).

Referring to the block diagram for the determining of the fresh air charge (S76) illustrated in FIG. 13, the detecting of the in-intake manifold fresh air partial pressure value (S72-1) confirms, as the in-intake manifold fresh air partial pressure value, the matching value to the fresh air density measurement value of the MAF sensor 5-3 or the direct measurement value of the air pressure sensor in the ECU 10. The detecting of the intake manifold pressure model value (S72-2) confirms the HFM measurement air flow as the intake manifold pressure model value obtained by being matched with the intake manifold pressure model map 11A in the ECU 10.

Finally, the determining of the target boost pressure (S72-3) is applied by a target boost pressure relationship formula below.

Target boost pressure relationship formula: E1=b+d where "E1" refers to the target boost pressure value, "b" refers to the in-intake manifold fresh air partial pressure value, and "d" refers to the intake manifold pressure model value.

Accordingly, the target boost pressure value (E) is determined by summing the in-intake manifold fresh air partial pressure value (b) and the intake manifold pressure model value (d).

As an example, the determining of the HFM engine air flow (S73, S75 to S77) includes applying the pressure/load conversion factor (S73), applying the intake manifold pressure ratio (S75), determining the fresh air charge (S76), and determining the HFM air flow measurement value based air flow (S77).

Referring to the block diagram for the determining of the fresh air charge (S56) illustrated in FIG. 13, the applying of the pressure/load conversion factor (S73) is performed by applying an engine load conversion formula in the ECU 10, and the applying of the intake manifold pressure ratio (S75) is performed by applying an intake manifold pressure ratio conversion formula in the ECU 10.

Engine load conversion formula: engine Load=F×E1

Intake manifold pressure ratio conversion formula: G=b/d where "E1" refers to the target boost pressure value, and "F" refers to the pressure/load conversion factor to which a number (for example, 0.1 to 1) or a ratio (for example, 10 to 100%) is applied and is confirmed by matching the boost pressure of the intake manifold pressure model map 11A with the engine load of the air flow model map 11B to match the pressure size of the target boost pressure value (E) with the load size of the engine 2 to represent the same engine state. Furthermore, "G" refers to the intake manifold pressure ratio, "b" refers to the in-intake manifold fresh air partial pressure value, "d" refers to the intake manifold pressure model value, and "/" refers to a division symbol of the two values.

As a result, the engine load (F×E1) is converted by being multiplied by the intake manifold pressure ratio (G), and the engine load is confirmed or derived by the fresh air charge (S76) by matching the air flow model map 11B with the engine load in the ECU 10.

Finally, the determining of the HFM air flow measurement value based air flow (S77) is performed based on the fresh air charge (S76) in the ECU 10 such that the HFM air flow measurement value based air flow calculation value is obtained by the following function.

HFM engine air flow calculation formula: $H3 \propto A \times E1 \times F \times G$ where "$\propto$" refers to a symbol representing the functional relationship, "H3" refers to the HFM air flow measurement value based air flow calculation value, "A" refers to the HFM air flow measurement value, "E1" refers to the engine load, "F" refers to the pressure/load conversion factor, "G" refers to the intake manifold pressure ratio, and "x" refers to a multiplication symbol of the two values.

Accordingly, the ECU 10 obtains the HFM air flow measurement value based air flow calculation value based on the existing logic, and utilizes the value as the HFM air flow to generate and then provide the fresh air charge data (a) to the HCU 20.

As described above, the method for preventing the engine air flow calculation error applied to the engine system 1 according to the exemplary embodiment of the present invention may classify the engine operation area of the engine 2 into the sensor measurement deviation generation area, the medium/high load areas, and the low load area, and classify the air flow calculation applied to the cylinder charging amount of the engine 2 as one of the air flow calculation control which applies the compensation measurement air flow to the sensor measurement deviation generation area, the air flow calculation control which applies the measurement pressure to the medium/high load areas, and the air flow calculation control which applies the measurement air flow to the low load area, excluding the influence of the HFM sensor error which causes the change in the fresh air charge and the inaccuracy of the EGR air flow modeling/active purge air flow modeling in the entire operation area of the engine, and improving the fuel learning value to the level of 1.01 to 0.99 compared to the existing fuel learning value with the level of 0.94 to 0.98 during the traveling in various areas after disabling the purge and rear trim.

Furthermore, the term "ECU" refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

The controller may be at least one microprocessor operated by a predetermined program which may include a series of commands for carrying out a method in accordance with various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

Furthermore, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method for preventing an engine air flow calculation error, the method comprising:
    classifying, by a controller, an engine operation area of an engine into a sensor measurement deviation generation area, medium/high load areas, and a low load area; and
    applying, by the controller, a medium/high load air flow control which performs the air flow calculation with a measurement pressure of a manifold air pressure (MAP) sensor in the medium/high load areas, applying a low load air flow control which performs an air flow calculation with a measurement air flow of a hot-film air mass flow (HFM) sensor in the low load area, and applying, by the controller, an air flow control accompanied by a measurement air flow compensation in which the air flow calculation is performed by compensating the measurement air flow of the HFM sensor in the sensor measurement deviation generation area.

2. The method of claim 1,
    wherein the sensor measurement deviation generation area is confirmed by torque abnormality or air flow abnormality of the engine.

3. The method of claim 1,
    wherein the air flow control accompanied by the measurement air flow compensation includes:
    detecting a measurement air flow by the HFM sensor;
    determining a boost pressure formed in an intake manifold of an intake system in the engine as a target boost pressure;

determining a compensated target boost pressure as a fresh air charge by compensating the target boost pressure with a pressure/load conversion factor and an intake manifold pressure ratio; and performing the air flow calculation according to the fresh air charge.

4. The method of claim 3, wherein the compensating of the target boost pressure includes:

determining an in-intake manifold compensation fresh air partial pressure value according to an in-intake manifold fresh air partial pressure value;

determining an intake manifold pressure model compensation value according to an intake manifold pressure model value; and applying the in-intake manifold compensation fresh air partial pressure value and the intake manifold pressure model compensation value.

5. The method of claim 4, wherein the determining of the in-intake manifold compensation fresh air partial pressure value includes:

confirming the in-intake manifold fresh air partial pressure value;

confirming an in-intake manifold exhaust gas recirculation (EGR) air flow partial pressure value by being matched with an EGR air flow model map;

confirming an in-intake manifold pre/post-purge pump partial pressure value by being matched with an active purge air flow model map; and applying the in-intake manifold EGR air flow partial pressure value and the in-intake manifold pre/post-purge pump partial pressure value to the in-intake manifold fresh air partial pressure.

6. The method of claim 4, wherein the determining of the intake manifold pressure model compensation value includes:

confirming the intake manifold pressure model value by being matched with an intake manifold pressure model map;

confirming an in-intake manifold EGR air flow partial pressure value by being matched with an EGR air flow model map;

confirming an in-intake manifold active purge air flow partial pressure value by being matched with an active purge air flow model map; and applying the in-intake manifold EGR air flow partial pressure value and the in-intake manifold active purge air flow partial pressure value to the intake manifold pressure model value.

7. The method of claim 3, wherein the pressure/load conversion factor is confirmed by matching a boost pressure of an intake manifold pressure model map with an engine load of an air flow model map.

8. The method of claim 3, wherein an in-intake manifold fresh air partial pressure value and an intake manifold model value are applied to the intake manifold pressure ratio.

9. The method of claim 1, wherein the medium/high load air flow control includes:

detecting a measurement pressure by the MAP sensor;

determining a boost pressure formed in an intake manifold of an intake system in the engine as a target boost pressure;

determining a compensated target boost pressure as a total amount of fresh air charges by compensating the target boost pressure with a pressure/load conversion factor;

compensating the total amount of fresh air charges with a fresh air charge; and performing the air flow calculation depending on the fresh air charge.

10. The method of claim 9, wherein the determining of the target boost pressure includes:

confirming an in-intake manifold EGR air flow partial pressure value by being matched with an EGR air flow model map;

confirming an in-intake manifold active purge air flow partial pressure value by being matched with an active purge air flow model map; and applying the in-intake manifold EGR air flow partial pressure value and the in-intake manifold active purge air flow partial pressure value.

11. The method of claim 9, wherein the pressure/load conversion factor is confirmed by matching a boost pressure of an intake manifold pressure model map with an engine load of an air flow model map.

12. The method of claim 9, wherein the compensating of the fresh air charge includes:

confirming an in-intake manifold pre/post-purge pump partial pressure value by being matched with an active purge air flow model map;

confirming an in-intake manifold EGR air flow partial pressure value by being matched with an EGR air flow model map;

detecting an HFM air flow measurement value; and converting an intake manifold pressure ratio into an intake manifold compensation pressure ratio, and applying the intake manifold compensation pressure ratio to the total amount of the fresh air charges.

13. The method of claim 12, wherein an in-intake manifold fresh air partial pressure value and an intake manifold model value are applied to the intake manifold pressure ratio, and a compensation constant is applied to the intake manifold pressure ratio.

14. The method of claim 1, wherein the low load air flow control includes:

detecting a measurement air flow by the HFM sensor;

determining a boost pressure formed in an intake manifold of an intake system in the engine as a target boost pressure using an in-intake manifold fresh air partial pressure value and an intake manifold pressure model value of an intake manifold pressure model map;

determining a compensated target boost pressure as a fresh air charge by compensating the target boost pressure with a pressure/load conversion factor and an intake manifold pressure ratio; and performing the air flow calculation according to the fresh air charge.

15. The method of claim 14, wherein the pressure/load conversion factor is confirmed by matching the boost pressure of the intake manifold pressure model map with an engine load of an air flow model map.

16. The method of claim 14, wherein an in-intake manifold fresh air partial pressure value and an intake manifold model value are applied to the intake manifold pressure ratio.

17. An engine system including:

a controller which is configured to classify an engine operation area of an engine into a sensor measurement deviation generation area, medium/high load areas, and a low load area, and is configured to classify, as an air flow calculation control applied to a cylinder charging amount of the engine, one of an air flow compensation control which applies a compensation measurement air flow to the sensor measurement deviation generation area, a manifold air pressure (MAP) air flow control which applies a measurement pressure to the medium/high load areas, and an HFM air flow control which applies a measurement air flow to the low load area;

a hot-film air mass flow (HFM) sensor which detects an air flow applied to the compensation measurement air flow and the measurement air flow in an intake manifold of an intake system of the engine;

a MAP sensor which detects an air pressure applied to the measurement pressure in the intake manifold of the intake system;

an active purge system (AFS) which traps an evaporation gas of fuel, and sends the trapped evaporation gas to the intake system to purge the evaporation gas; and an exhaust gas recirculation (EGR) system which uses, as an exhaust gas recirculation (EGR) gas, and sends a predetermined amount of exhaust gases of the exhaust gases flowing through an exhaust system of the engine by the intake system.

18. The engine system of claim 17,
wherein the HFM sensor is located at a front end portion of a throttle mounted in the intake system, and
wherein the MAP sensor is located at a rear end portion of the throttle.

19. The engine system of claim 17,
wherein the AFS is connected to a purge control solenoid valve (PCSV) which is mounted at a rear end portion of the MAP sensor in the intake system.

20. The engine system of claim 17,
wherein during the air flow calculation control, the controller is configured to match an EGR gas air flow with an EGR air flow model map, and matches a purge air flow with an active purge air flow model map.

\* \* \* \* \*